United States Patent
Yatabe et al.

(10) Patent No.: US 7,335,124 B2
(45) Date of Patent: Feb. 26, 2008

(54) VEHICLE TRANSMISSION CONTROL DEVICE

(75) Inventors: Kazuo Yatabe, Yokosuka (JP); Toshikazu Oshidari, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/503,844

(22) Filed: Aug. 14, 2006

(65) Prior Publication Data

US 2007/0111852 A1    May 17, 2007

(30) Foreign Application Priority Data

Aug. 23, 2005    (JP)    ............... 2005-240869

(51) Int. Cl.
*B60W 10/02*    (2006.01)
(52) U.S. Cl. ............... 475/5; 477/35; 180/65.2
(58) Field of Classification Search ............... 318/432; 477/107, 5; 180/65.2
See application file for complete search history.

(56) References Cited

U.S. PATENT DOCUMENTS

| | | | |
|---|---|---|---|
| 6,371,878 B1 * | 4/2002 | Bowen | 475/5 |
| 6,428,438 B1 * | 8/2002 | Bowen | 475/5 |
| 6,622,805 B2 * | 9/2003 | Nakashima | 180/65.2 |
| 7,207,915 B2 * | 4/2007 | Oshidari et al. | 475/5 |
| 2003/0173934 A1 * | 9/2003 | Arimitsu | 322/34 |
| 2005/0102082 A1 * | 5/2005 | Joe et al. | 701/54 |
| 2005/0178593 A1 * | 8/2005 | Oshidari | 180/65.2 |
| 2005/0247503 A1 * | 11/2005 | Imazu | 180/300 |
| 2006/0006734 A1 * | 1/2006 | Tabata et al. | 303/3 |
| 2006/0017414 A1 * | 1/2006 | Joe et al. | 318/432 |
| 2007/0021257 A1 * | 1/2007 | Klemen et al. | 475/5 |
| 2007/0072723 A1 * | 3/2007 | Klemen et al. | 475/5 |

FOREIGN PATENT DOCUMENTS

| | | |
|---|---|---|
| JP | 2004-262275 | 9/2004 |
| JP | 2006-034076 | 2/2006 |

\* cited by examiner

*Primary Examiner*—Lincoln Donovan
*Assistant Examiner*—Antony M. Paul
(74) *Attorney, Agent, or Firm*—Global IP Counselors, LLP

(57) ABSTRACT

The invention is directed to a transmission that controls multiple torque generating elements. The transmission control device utilizes two torque generating elements that are connected to an output element through a differential which has two degrees of freedom and at least three rotating elements. The transmission can use the inertia response of the torque generating elements during a change in a command value of a demanded driving force and improves the ability to increase and decrease the output driving force and the responsiveness of any increase or decrease of the driving force.

20 Claims, 13 Drawing Sheets

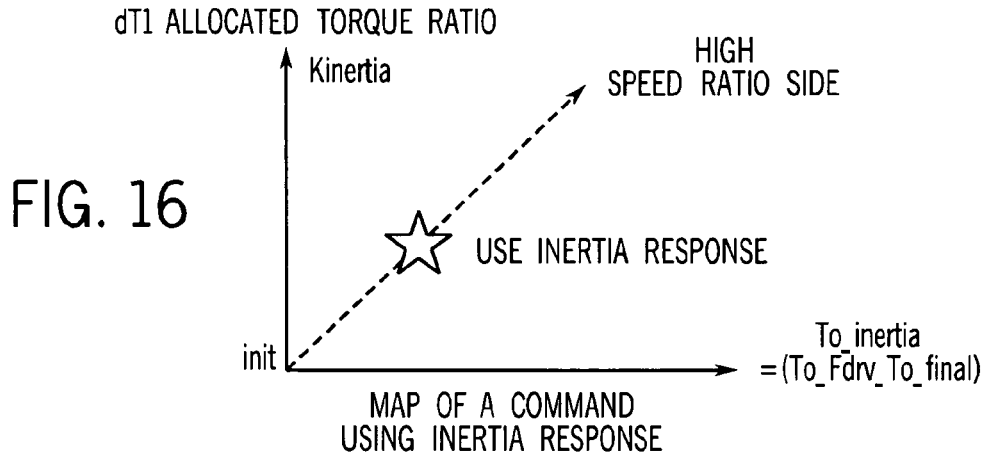
FIG. 16
MAP OF A COMMAND USING INERTIA RESPONSE
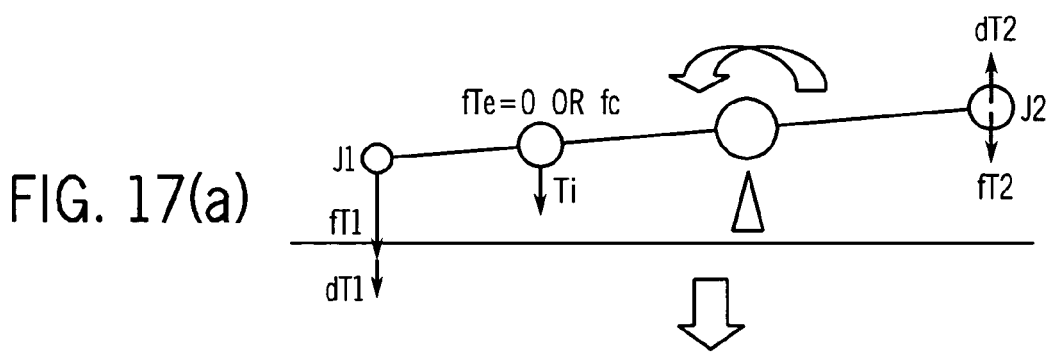
FIG. 17(a)
FIG. 17(b)
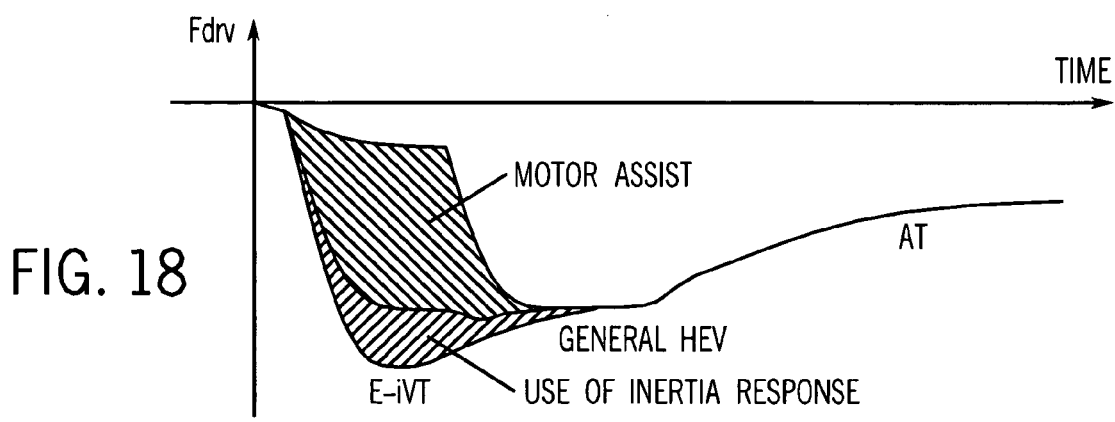
FIG. 18
RESPONSIVENESS TO A DRIVING FORCE AND ABILITY TO GENERATE THE DRIVING FORCE

US 7,335,124 B2

VEHICLE TRANSMISSION CONTROL DEVICE

This application claims priority from Japanese Patent Application No. 2005-240869, filed Aug. 23, 2005, the entire contents of which is incorporated herein by reference.

TECHNICAL FIELD

The invention relates to vehicle transmission control, and more specifically, devices to control multiple torque generating elements.

BACKGROUND

Hybrid vehicles typically include a transmission controller that computes a target torque based on the difference between a number of target input rotations and a number of actual input rotations during and after shifting of the transmission. Then, torque to be produced at the transmission is calculated based on lever ratio and inertia of each element, and torque to be output for driving is calculated based on a demanded driving force and lever balance at a variable speed mode. The torque to be produced at the transmission is combined with the torque to be output for driving, thereby setting a torque command value. As for each torque generating element, e.g., an engine or an electric motor, the transmission controller controls the lever by outputting the predetermined torque command value to shift at the appropriate speed.

In conventional systems, the transmission control device of a hybrid vehicle calculates torque for transmission, the inertia of each torque generating element (e.g., an engine, a first motor and a second motor) is offset by the torque generating elements themselves so that the gear is shifted. Therefore, for example, when the gear is shifted to a low transmission gear ratio by a "kick-down" operation, the driving force cannot exceed the one which is determined by combination of the torque for driving each of the torque generating elements. Thus, it is typically not possible to expect an increase of a driving force in response to the kick-down operation of the driver.

SUMMARY

In general, the invention is directed to a speed ratio control device (e.g., a controller) that controls multiple torque generating elements, such as engines or motors, within a vehicle. In contrast to conventional systems, embodiments of the invention address the previously described problem and attempt to provide a vehicle speed ratio change control device which can use the inertia response, e.g. the reaction torque in response to the inertia of torque generating elements, of torque generating elements during a change in the command value of a demanded driving force. Embodiments of the invention also improves the ability of the speed ratio change control device to increase and decrease the output driving force and the responsiveness of the increase and decrease of the output driving force.

The speed ratio change controller of the present invention may control at least two torque generating elements (a first torque generating element and second torque generating element) as the driving sources for a vehicle. In one example configuration, the speed ratio change control device controls two torque generating elements that are connected to an output element through a differential which has two degrees of freedom. And the differential has at least three rotating elements.

In one embodiment, when a demand for driving force is changed, the speed ratio change control device determines a torque value for a torque generating element using "speed ratio change using an inertia response" (the reaction torque in response to the inertia). In the speed ratio change using an inertia response, reaction torque, which uses inertia of one of the previously described two torque generating elements, transitionally affects the previously described output element. For example, when inertia of the second torque generating element is used during low speed ratio, the speed ratio change control device shares an inertia response of the second torque generating element with the allocation of the reaction torque for the first torque generating element. As a result, the inertia response of the second torque generating element transitionally affects the output element and the driving force, which affects the output element, is determined by a combination of the torque for driving each torque generating element as well as the reaction of the inertia. In this manner, the driving force is increased with a quick responsiveness to the kick-down operation of the driver.

In other words, conventional devices allow inertia of each torque generating element to be offset by the torque generating elements themselves. In the present invention, the speed ratio change control device effectively uses the offset inertia for increase and decrease of the driving force. As a result, when a demand for driving force changes, the speed ratio change control device uses the inertia of the torque generating elements to improve the ability of the transmission to increase and decrease the output driving force as well as the responsiveness of the output driving force.

In one embodiment, a speed ratio change control system for a vehicle includes a first torque-generating element, a second torque-generating element, a differential having two degrees of freedom and at least three rotating elements that are connected to an output element, the first torque-generating element and the second torque-generating element, respectively, and a speed ratio change controller arranged and configured to control a speed ratio of a vehicle based on a demanded driving force. In addition, the speed ratio change controller changes the speed ratio by transitionally adding at least a part of an inertia response of one of the first and second torque-generating elements to the other of the first and second torque-generating elements.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 16 is a view showing an inertia response-utilized command map which is used in the speed ratio change using an inertia response of Embodiment 3.

FIGS. 17(a)-17(b) are alignment charts showing an example where a torque command value is determined during high speed ratio change which is done by the speed ratio change using an inertia response of Embodiment 3.

FIG. 18 is a diagram of a driving force time chart showing the driving force responsiveness and generating ability during high speed ratio change which is done by the speed ratio change using an inertia response of Embodiment 3.

DETAILED DESCRIPTION

Figure 1:
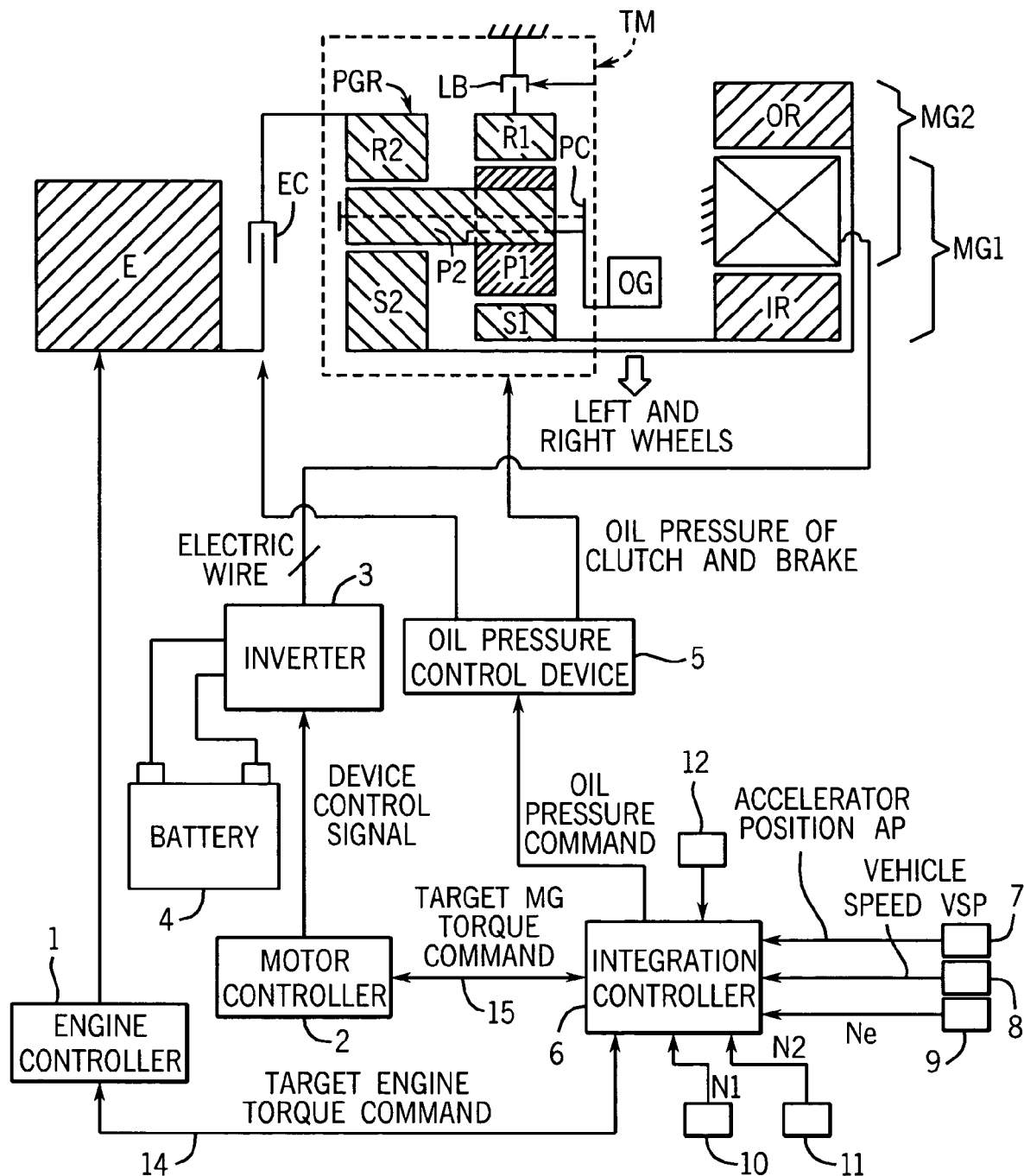
FIG. 1 is an overall system chart showing a hybrid vehicle where the speed ratio change control device of Embodiment 1 is used.

FIG. 1 is an overall system chart showing a hybrid vehicle where the speed ratio change control device of Embodiment 1 is used. As shown in FIG. 1, the driving system of the hybrid vehicle of Embodiment 1 includes an engine E (a torque generating element), a first motor generator MG1 (a first torque generating element), a second motor generator MG2 (a second torque generating element), an output gear OG (an output element) and a driving force combining transmission (TM). Engine E may be a gasoline engine or a diesel engine and controls valve openings of throttle valves based on a control command from engine controller 1. Engine E, first motor generator MG1, second motor generator MG2, or any other torque generating element may provide means for generating torque.

First motor generator MG1 and second motor generator MG2 are synchronous type motor generators wherein a permanent magnet is built in the rotor and a coil is wound around the stator. They are independently controlled by a control command from motor controller 2, which is described below, by applying a three-phase alternate current which is generated by inverter 3. By placing inner rotor IR in the inside of stator S and placing outer rotor OR in the outside of stator S and passing a compound current made from a combination of two driving electric currents through the coil of stator S, Embodiment 1 uses a multiple-layered motor structure which, although it appears to be a single motor, has two independent motors, first motor generator MG1 (inner rotor IR and stator S) and second motor generator MG2 (outer rotor OR and stator S).

The driving force combining transmission TM is comprised of Ravigneaux planetary gear row PGR (differential arrangement or connecting means) and low brake LB. The previously described Ravigneaux planetary gear row PGR is comprised of first sun gear S1, first pinion P1, first ring gear R1, second sun gear S2, second pinion P2, second ring gear R2 and common carrier PC which supports first pinion P1 and second pinion P2 which are mutually engaged. In other words, Ravigneaux planetary gear row PGR has five rotating elements which are first sun gear S1, first ring gear R1, second sun gear S2, second ring gear R2 and common carrier PC. Next, the connecting relationship of input and output elements which correspond to these five rotating elements will be described.

First motor generator MG1 is connected to the previously described first sun gear S1. The previously described first ring gear R1 is fixably to a case through low brake LB. Second motor generator MG2 is connected to the previously described second sun gear S2. Engine E is connected to the previously described second ring gear R2 through engine clutch EC. Output gear OG is directly connected to the previously described common carrier PC. Here, output gear OG transmits a driving force to left and right driving wheels through the differential and drive shaft which are not shown in the figure.

Based on the previously described connecting relationship of FIG. 1, the five elements are arranged in the alignment chart of FIG. 2 in the order of first motor generator MG1 (first sun gear S1), engine E (second ring gear R2), output gear OG (common carrier PC), low brake LB (first ring gear R1) and second motor generator MG2 (second sun gear S2). It is possible to use a rigid-body lever model with two degrees of freedom which can express in a simplified manner the mechanism of Ravigneaux planetary gear row PGR (relationship of the speed of each rotating element). Here, the "alignment chart" is a linear view showing the speed which is used to obtain the gear ratio of the differential gear by drawing a figure rather than using a formula. In the alignment chart, the vertical axis represents the number of rotations (speed of rotations) of each rotating element and the horizontal axis represents each rotating element so that the gap between each rotating element is the lever ratio based on the ratio of the number of gears of the sun gear and the ring gear.

The previously described engine clutch EC and low brake LB are the multiple-plate friction clutch and the multiple-plate friction brake which are engaged by the oil pressure from oil pressure control device 5 described below. Engine clutch EC is placed along with engine E in the position which corresponds to the rotating speed axis of second ring gear R2 in the alignment chart of FIG. 2. Low brake LB is placed on the rotating speed axis of first ring gear R1 (position between the rotating speed axis of output gear OG and the rotating speed axis of second sun gear S2) in the alignment chart of FIG. 2.

Next, the control system of the hybrid vehicle will be described. As shown in FIG. 1, the control system of the hybrid vehicle of Embodiment 1 is comprised of engine controller 1, motor controller 2, inverter 3, battery 4, oil pressure control device 5, integration controller 6, accelerator position sensor 7, vehicle speed sensor 8, engine rotating number sensor 9, first motor generator rotating number sensor 10, second motor generator rotating number sensor 11, second ring gear rotating number sensor 12 and wheel speed sensor 13.

The previously described engine controller 1 outputs a command to control engine operating points (Ne and Te) to, for example, an actuator of the throttle valve which is not shown in the figure based on accelerator position AP from accelerator position sensor 7 and a target engine torque command from integration controller 6 which inputs engine rotating number Ne from engine rotating number sensor 9.

The previously described motor controller 2 outputs a command which separately controls motor operating points (N1 and T1) of first motor generator MG1 and motor operating points (N2 and T2) of second motor generator MG2, to inverter 3 based on a target motor generator torque from integration controller 6 which inputs motor generator rotating numbers N1 and N2 from motor generator rotating number sensors 10 and 11 (for example, resolvers). Here, information on the charging state of battery 4 is output from motor controller 2 to integration controller 6.

The previously described inverter 3 is connected to the coil of stator S which is shared with the previously described first motor generator MG1 and second motor generator MG2, creates an independent three-phase alternate current based on a command from motor controller 2 and generates a compound current for driving force which uses the three-phase alternate current. Battery 4 which discharges during the power running and charges during the regeneration is connected to inverter 3.

The previously described oil pressure control device 5 receives an oil pressure command from integration controller 6 and performs oil pressure engaging control and oil pressure opening control of engine clutch EC and low brake LB. The oil pressure engaging control and oil pressure opening control include half clutching control based on "slipping engaging control" wherein the clutch is engaged by slipping and "slipping opening control" wherein the clutch is opened by slipping.

The previously described integration controller 6 inputs accelerator position AP from accelerator position sensor 7, vehicle speed VSP from vehicle speed sensor 8, engine rotating number $\omega e$ from engine rotating number sensor 9, first motor generator rotating number N1 from first motor generator rotating number sensor 10, second motor generator rotating number N2 from second motor generator rotating number sensor 11, lever input point rotating number wi_act from second ring gear rotating number sensor 12 and wheel speed from wheel speed sensor 13 and conducts predetermined computation. Then, integration controller 6 outputs control commands to engine controller 1, motor controller 2 and oil pressure control device 5 based on the results of the computation.

Here, integration controller 6 and engine controller 1 are connected by dual-directional communication wire 14 and integration controller 6 and motor controller 2 are connected by dual-directional communication wire 15 for information exchanges.

Next, the running modes of the hybrid vehicle will be described. The running modes of the hybrid vehicle of Embodiment 1 are electric vehicle variable speed mode (hereinafter called "EV mode"), electric vehicle fixed speed ratio mode (hereinafter called "EV-LB mode"), hybrid vehicle fixed speed ratio mode (hereinafter called "LB mode") and hybrid vehicle variable speed mode (hereinafter called "E-iVT mode").

Figure 2A:
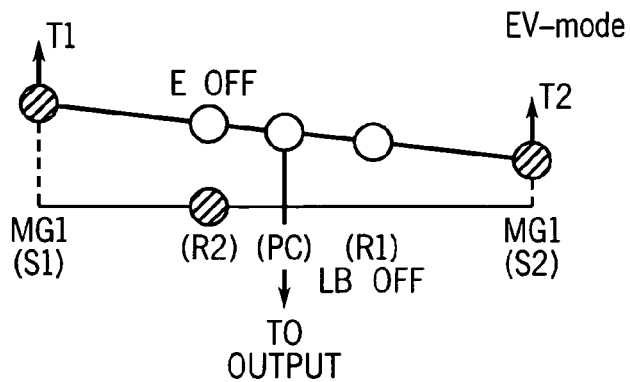
FIGS. 2(*a*)-2(*d*) are alignment charts showing each running mode by Ravigneaux planetary gear rows which are used for a hybrid vehicle where the speed ratio change control device of Embodiment 1 is used.

The previously described "EV mode" is, as shown in the alignment chart of FIG. 2(a), a variable speed mode wherein the vehicle runs only with two motor generators MG1 and MG2. Here, engine E is stopped and engine clutch EC is opened.

Figure 2B:
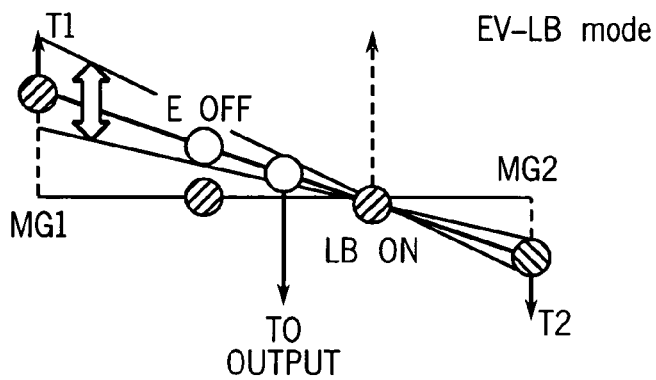

The previously described "EV-LB mode" is, as shown in the alignment chart of FIG. 2(b), a fixed speed ratio mode wherein the vehicle runs only with the two motor generators MG1 and MG2 with low brake LB being engaged. Here, engine E is stopped and engine clutch EC is opened. Since the reduction ratio from the first motor generator MG1 to the Output and the reduction ratio from the second motor generator MG2 to the Output are increased, the driving force is increased in this mode.

Figure 2C:
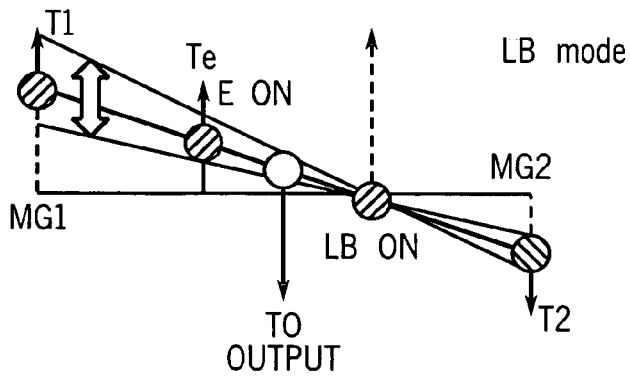

The previously described "LB mode" is, as shown in the alignment chart of FIG. 2(c), a fixed speed ratio mode wherein the vehicle runs with engine E and motor generators MG1 and MG2 with low brake LB being engaged. Here, engine E is used and engine clutch EC is engaged. Since the reduction ratio from engine E and motor generators MG1 and MG2 are increased, the driving force is increased in this mode.

Figure 2D:
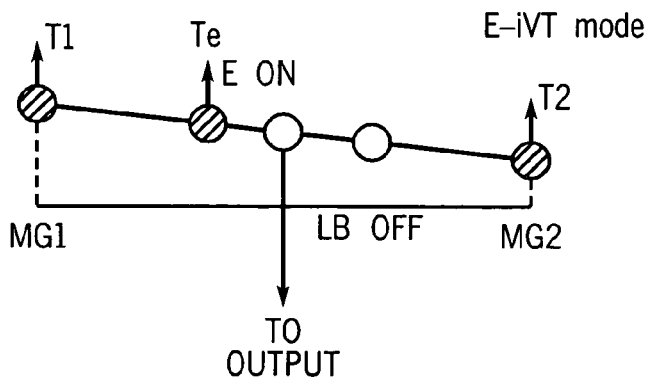

The previously described "E-iVT mode" is, as shown in the alignment chart of FIG. 2(d), a variable speed mode wherein the vehicle runs with engine E and motor generators MG1 and MG2. Here, engine E is used and engine clutch EC is engaged.

Figure 3:
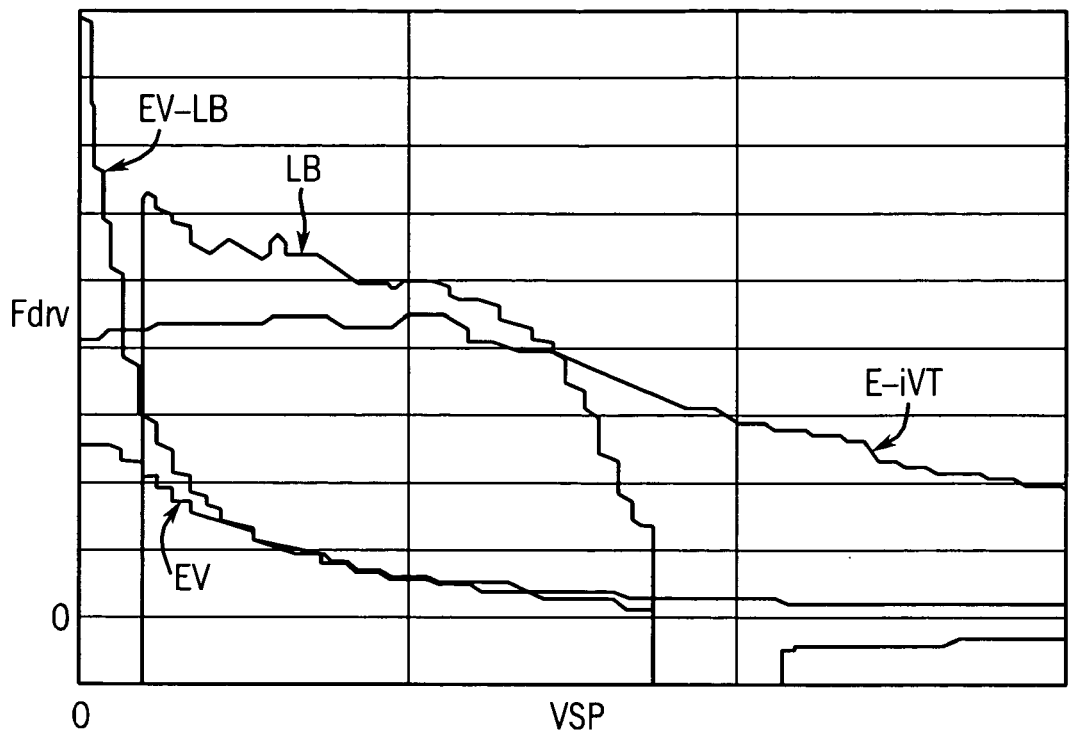
FIG. 3 is a view showing an example of a running mode map of a hybrid vehicle where the speed ratio change control device of Embodiment 1 is used.

The mode transition control of the previously described four running modes is done by integration controller 6. In other words, a running mode map shown in FIG. 3 which allocates the previously described four running modes is pre-installed in integration controller 6 between the three-dimensional space made of demanded driving force Fdrv (which can be obtained by accelerator position APO), vehicle speed VSP and battery SOC. When the vehicle is in a stopped or running state, the running mode map is searched by each detecting value of demanded driving force Fdrv, vehicle speed VSP and battery SOC and a most suitable running mode is selected based on the vehicle operating point and battery charging amount which are determined by demanded driving force Fdrv and vehicle speed VSP. Here, FIG. 3 is an example of the running mode map which two-dimensionally expresses demanded driving force Fdrv and vehicle speed VSP by cutting off the three-dimensional running mode map with a value where battery SOC has sufficient capacity.

Figure 4:
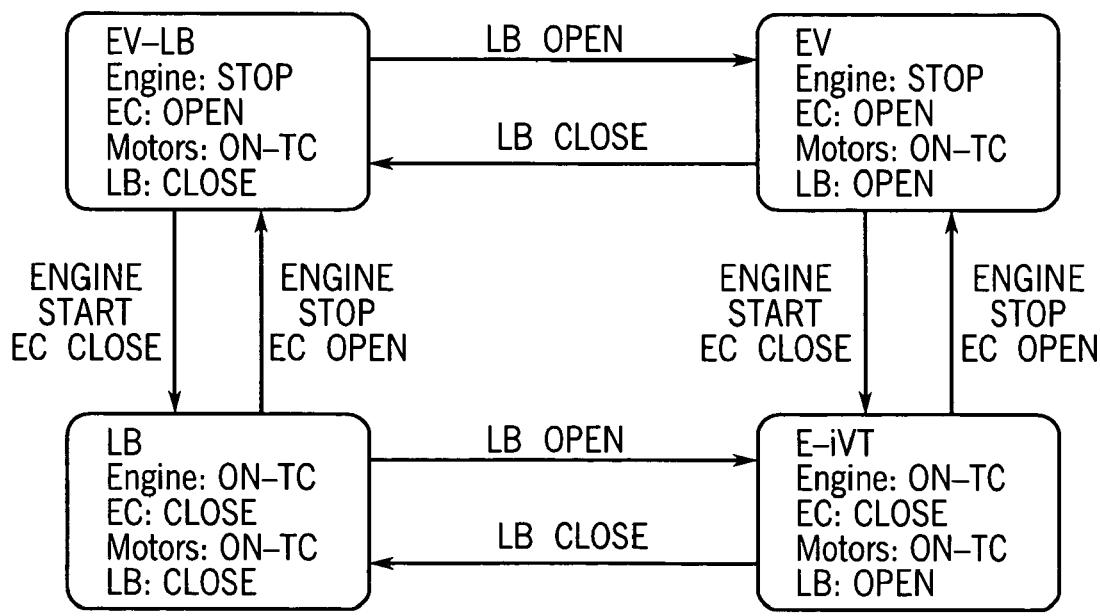
FIG. 4 is a view showing mode transition paths among four running modes of a hybrid vehicle where the speed ratio change control device of Embodiment 1 is used.

When mode transition between the "EV mode" and the "EV-LB mode" is conducted by selecting the previously described running mode map, engagement and opening of low brake LB are performed as shown in FIG. 4. When mode transition between the "E-iVT mode" and the "LB mode" are conducted, engagement and opening of low brake LB are performed as shown in FIG. 4. Also, when mode transition between the "EV mode" and the "E-iVT mode" are conducted, engagement and opening of engine clutch EC are performed along with starting and stopping of engine E as shown in FIG. 4. When mode transition between the "EV-LB mode" and the "LB mode" are conducted, engagement and opening of engine clutch EC are performed along with starting and stopping of engine E as shown in FIG. 4.

Figure 5:
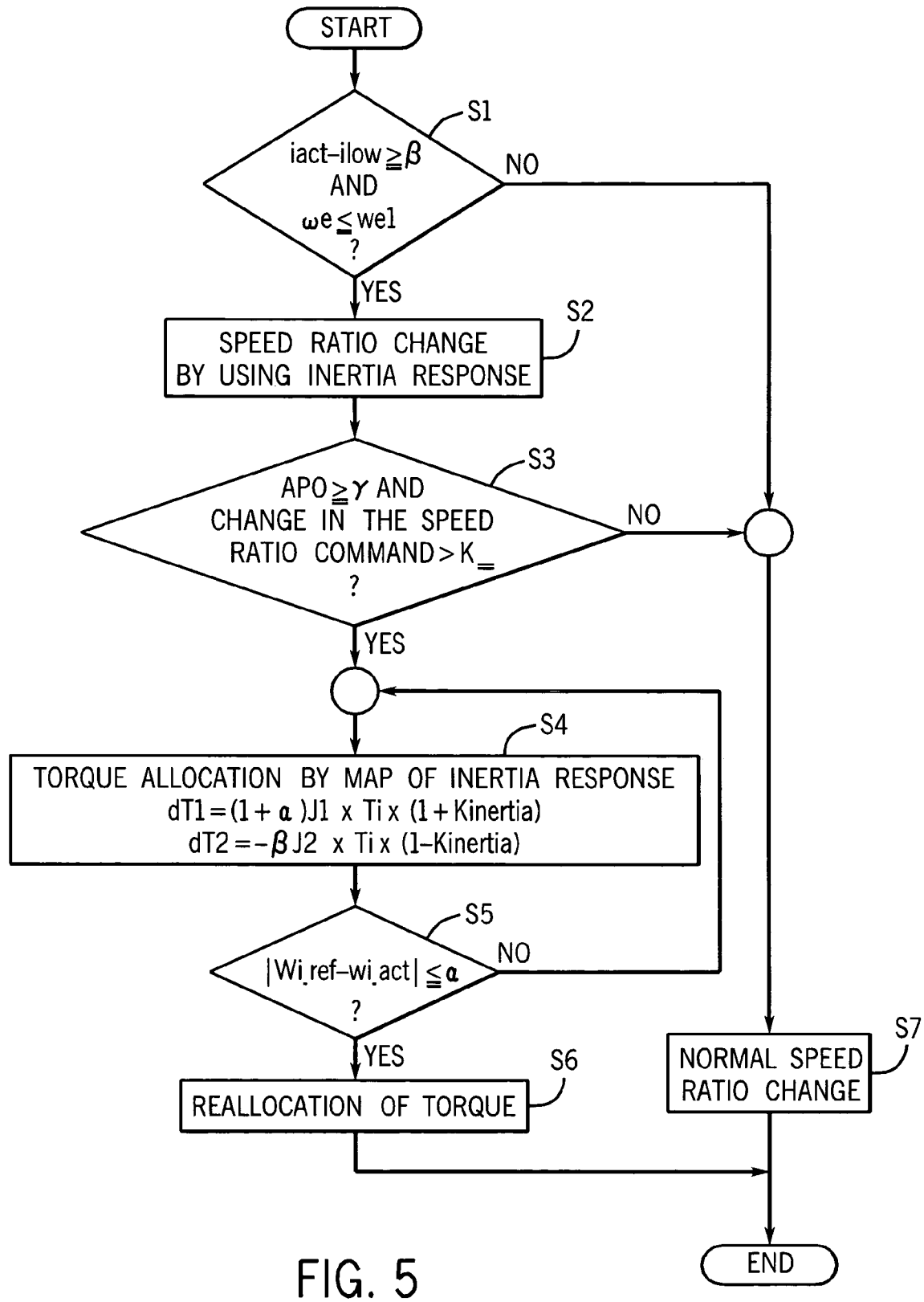
FIG. 5 is a flowchart showing a flow of a speed ratio change control process performed by the integration controller of Embodiment 1.

Next, the control mechanism of the transmission will be described. FIG. 5 is a flowchart showing a flow of a speed ratio change control process performed by integration controller 6 of Embodiment 1. Each step of the flowchart is described below (speed ratio change control means).

In step S1, whether or not the difference between actual speed ratio iact and lowest speed ratio ilow is predetermined value $\beta$ or higher during the "E-iVT mode" with which the vehicle runs is determined, and at the same time, whether or not engine rotating number $\omega e$ is predetermined rotating number we1 or less is determined. When the answer to the question is YES, the next step is step S2 and when it is NO, the next step is step S7.

In step S2, based on the determination in step 1 that iact−ilow$\geq\beta$ and $\omega e \leq$ we1, that is, the determination that it is possible to change the low speed ratio by using a inertia response, the normal speed ratio change mode is shifted to the speed ratio change using a inertia response mode and the next step is step 3.

In step 3, based on the shift to the speed ratio change using an inertia response, i.e., means for transmitting inertia response mode in step 2, whether or not accelerator position APO is predetermined threshold value $\gamma$ or higher, and at the same time, whether or not the change in the speed ratio command is predetermined threshold value $\kappa$ or higher. When the answer to the question is YES, the next step is step S4. In other words, in step S3, even when the mode is shifted to the speed ratio change using an inertia response mode, the low speed ratio change which uses inertia response is implemented only when the driver conducts the kick-down operation. When the answer to the question is NO in step 3, the next step is step S7. The inertia response is a reaction torque in response to inertia from at least one of the torque-generating elements.

Figure 6:
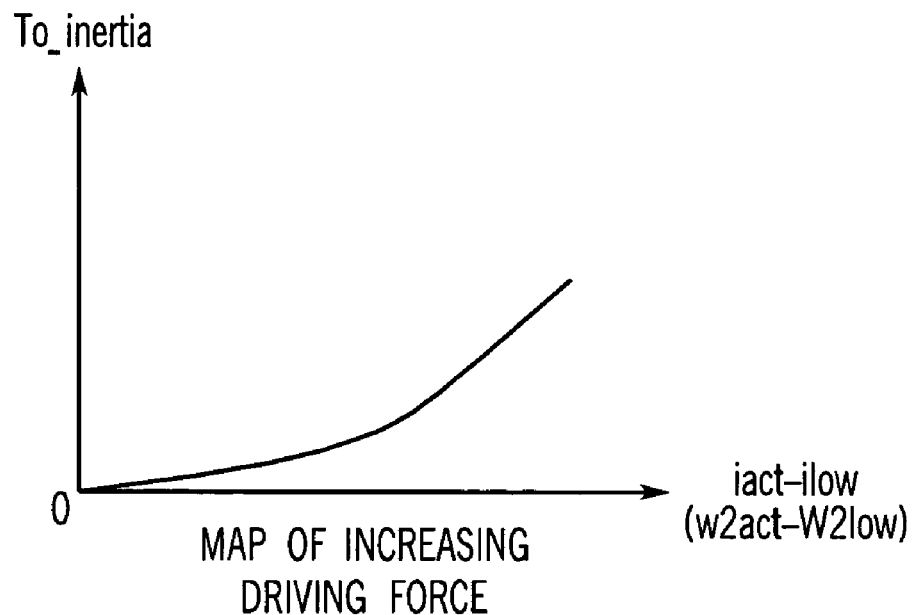
FIG. 6 is a view showing an inertia-increased driving force map which is used in the speed ratio change using a inertia response of Embodiment 1.

In step S4, based on the determination in step S3 that APO$\geq\gamma$ and change in the speed ratio command $\geq\kappa$, inertia increasing driving force To_inertia is obtained by using a difference between actual speed ratio iact and the lowest speed ratio ilow (the difference between the actual second motor generator input rotating number w2act and the lowest second motor generator input rotating number W2low) and the inertia increasing driving map shown in FIG. 6. Then, based on inertia increasing driving force To_inertia and the inertia response using command map which continuously uses the inertia response shown in FIG. 7, dT1-allocated torque ratio K inertia of control torque for transmission dT1 of first motor generator MG1 is determined. Based on the obtained dT1-allocated torque ratio K inertia, the torque allocation of control torque dT1 for transmission of first motor generator MG1 and control torque dT2 for transmission of second motor generator MG2 is determined by using a formula described below. The next step is step S5.

Figure 7:
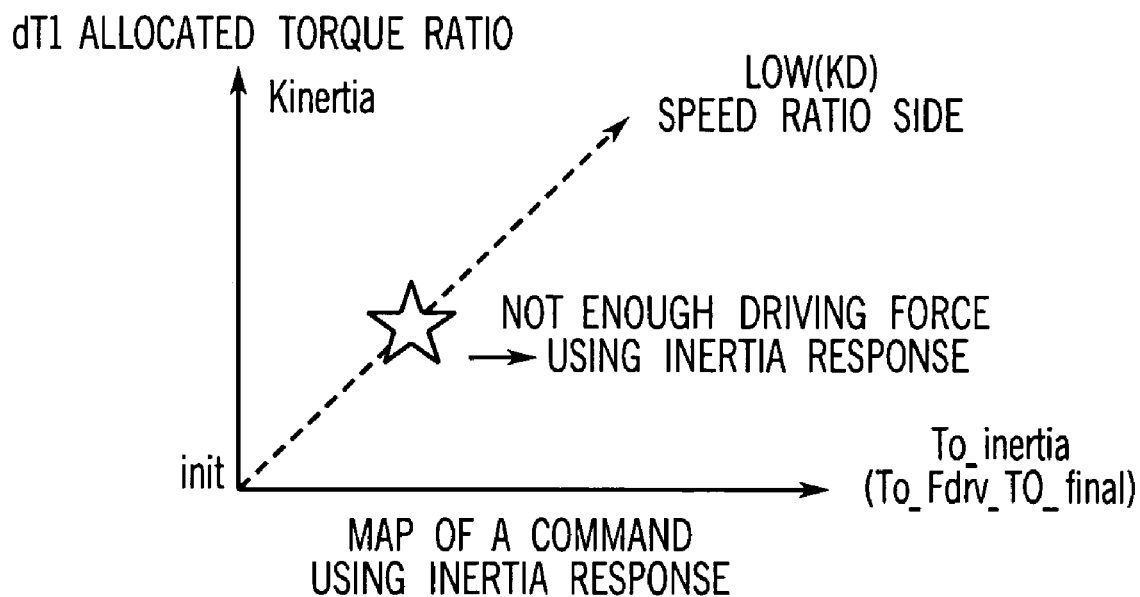
FIG. 7 is a view showing an inertia response-utilized command map which is used in the speed ratio change using a inertia response of Embodiment 1.

Here, to continuously use the inertia response, the inertia response using command map shown in FIG. 7 has a characteristic line so that dT1-allocated torque ratio K inertia increases in proportion to inertia increasing driving force To_inertia (=To_Fdrv−To_final).

Also, control torque dT1 for transmission and control torque dT2 for transmission are obtained by the following formulas:

$$dT1 = (1+\alpha)J1 \times Ti \times (1+K \text{ inertia})$$

$$dT2 = -\beta J2 \times Ti \times (1-K \text{ inertia}).$$

In the formulas, $\alpha$ and $\beta$ represent lever ratio and Ti represents lever operating torque which is used to stabilize the speed ratio which is calculated from the deviation of the target rotating number of input points from the actual rotating number. J1 represents inertia of first motor generator MG1 and J2 represents inertia of second motor generator MG2.

In step S5, based on the torque allocation by the inertia response map in step S4, whether or not the absolute value of the difference between the target input rotating number Wi_ref and the actual input rotating number wi_act is predetermined value a or less is determined. When the answer to the question is YES, the next step is step S6 and when it is NO, the next step is back to step S4.

In step S6, based on the determination in step S5 that |Wi_ref−wi_act|$\leq\alpha$, the torque allocation which uses the inertia response is shifted to the torque allocation with normal speed ratio change thereby ending the speed ratio change using an inertia response and moving on to END.

In step S7, based on the determination in step S1 that the answer is YES to iact−ilow$\geq\beta$ and that it is NO to $\omega e \leq$ we1, or the determination in step S3 that the answer is YES to APO$\geq\gamma$ and that it is NO to change in the speed ratio command $\geq\kappa$, normal speed ratio change wherein inertia of each element is offset by the elements themselves is implemented thereby moving on to END.

When the vehicle runs selecting the "E-iVTmode", if the difference between actual speed ratio iact and the lowest speed ratio ilow is less than predetermined value $\beta$, or engine rotating number $\omega e$ exceeds predetermined rotating number we1, step S1 is followed by step S7 in the flowchart of FIG. 5. In step S7, normal speed ratio change wherein inertia of each element is offset by the elements themselves is implemented.

When the vehicle runs selecting the "E-iVT mode", it is iact−ilow$\geq\beta$ and $\omega e \leq$ we1. However, when accelerator position APO is less than predetermined threshold value $\gamma$, or the change in the speed ratio is less than predetermined threshold value $\kappa$, step S1 is followed by step S2, step S2 is followed by step S3 and step S3 is followed by step S7 in the flowchart of FIG. 5. In step S7, normal speed ratio change wherein inertia of each element is offset by the elements themselves is implemented.

On the other hand, when the driver conducts the kick-down operation wherein the driver pushes the accelerator deep down when the vehicle runs selecting the "E-iVT mode", it is iact–ilow≧β and ωe≦we1, APO≧γ and the change in the speed ratio command ≧κ, step S1 is followed by step S2, step S2 is followed by step S3, step S3 is followed by step S4 and step S4 is followed by step S5 in the flowchart of FIG. 5. In step S4, the torque allocation which uses the inertia response is implemented until the determination is done as |Wi_ref−wi_act|≦α in step S5. When the determination is done as |Wi_ref−wi_act|≦α in step S5, step S5 is followed by step S6. In step S6, the torque allocation which uses the inertia response is shifted to the torque allocation in the normal speed ratio change thereby ending the speed ratio change which uses the inertia response.

Figure 8:
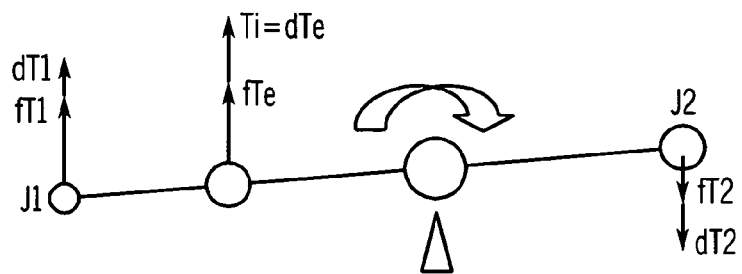
FIG. 8 is an alignment chart showing an example where a torque command value is determined during normal low speed ratio change.

First, in the hybrid system shown in Embodiment 1, during the low speed ratio change by kick-down operation, normally, control torque for speed ratio change Ti is calculated from the difference between the target input rotating number and actual input rotating number after the speed ratio change is done. Then, torque dT1, dTe and dT2 for speed ratio change is calculated from the lever ratio and the inertia of each element. Torque fT1, fTe and fT2 for driving is calculated from the demanded driving force and the lever balance in the "E-iVT mode". Then, by combining torque dT1, dTe and dT2 with torque fT1, fTe and fT2 for driving, torque command values for the engine, the first motor generator and the second motor generator are determined. By outputting these torque command values, the lever is operated and speed ratio change is shifted (FIG. 8).

Here, the formulas to calculate control torque Ti for transmission and torque dT1 and dT2 for transmission are as follows:

$$Ti = k_{PID} \times (\omega i\_ref - \omega i\_act)$$

$$dT1 = (1+\alpha)J1 \times Ti$$

$$dT2 = -\beta J2 \times Ti.$$

However, in the previously described normal speed ratio change control method, when torque dT1, dTe and dT2 for transmission is calculated, each torque generating element itself offsets inertia J1, J2 and Je of each torque generating element (engine, first motor generator and second motor generator) to shift the gear. Therefore, for example, when the speed ratio is shifted to low by the kick-down operation and the like, it is not possible to exceed the driving force which is determined by the combination of torque for driving fT1, fTe and fT2 of each torque generating element. Therefore, increase of the driving force with a good responsiveness which corresponds to the kick-down operation by the driver cannot be expected.

On the other hand, in the speed ratio change control of Embodiment 1, when the command value for the demanded driving force by the kick-down operation and the like is increased, torque dT1 and dT2 for transmission of both motor generators MG1 and MG2 is determined so that the reaction torque which uses the inertia of second motor generator MG2 is transitionally operated for output gear OG.

Figure 9:
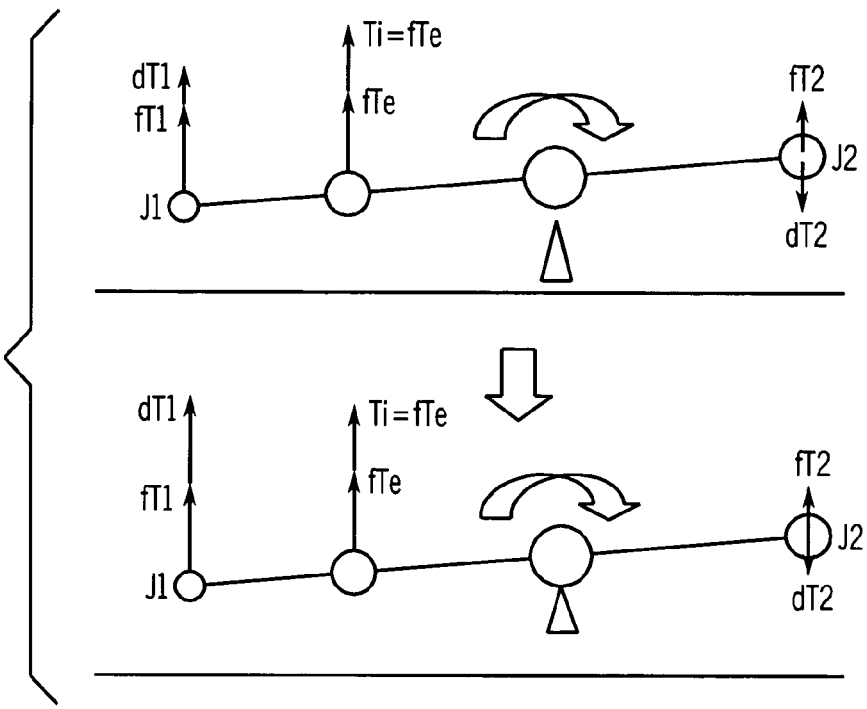
FIG. 9 is an alignment chart showing an example where a torque command value is determined during low speed ratio change which is done by the speed ratio change using a inertia response of Embodiment 1.

In other words, when the speed ratio is shifted to low by the kick-down operation and the like, as shown in FIG. 9, torque dT1 for transmission of first motor generator MG1 takes partial charge of inertia J2 of the second motor generator and allocates more than torque dT1 for normal speed ratio change. As a result, the inertia response torque of second motor generator MG2 transitionally affects output gear OG. The driving force which affects the output gear OG is made of the driving force determined by a combination of the torque for driving of each torque generating element and inertia increasing driving force To_inertia which uses the inertia response. As a result, the driving force is increased with a good responsiveness to the kick-down operation by the driver. In other words, while normally inertia of each torque generating element is offset by the elements themselves, in this case, the offset inertia is effectively used to increase the driving force.

Figure 10:
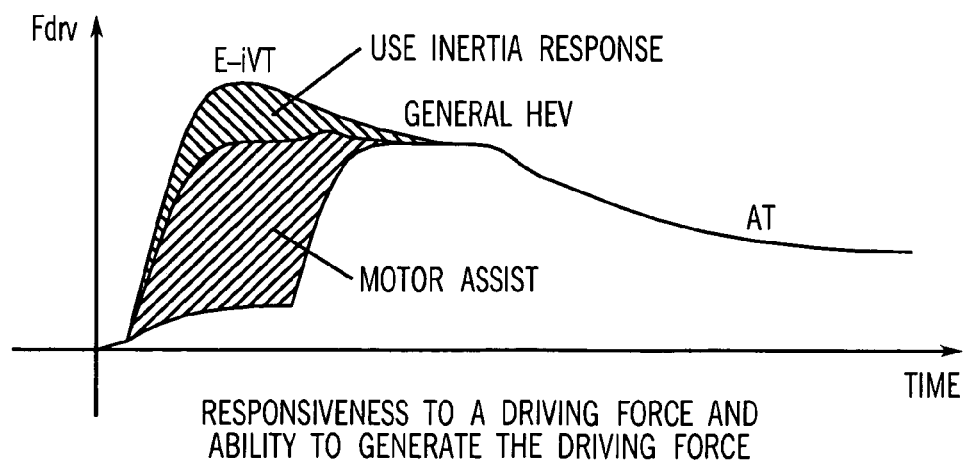
FIG. 10 is a diagram of a driving force time (c)hart showing the driving force responsiveness and generating ability during low speed ratio change which is done by the speed ratio change using a inertia response of Embodiment 1.

Consequently, when the command value for the demanded driving force is increased, the inertia response of second motor generator MG2 is used and, as shown in FIG. 10, compared with a commonly-used hybrid vehicle (HEV), it is possible to improve the ability to increase output driving force Fdrv and the responsiveness to increase the driving force.

Figure 11:
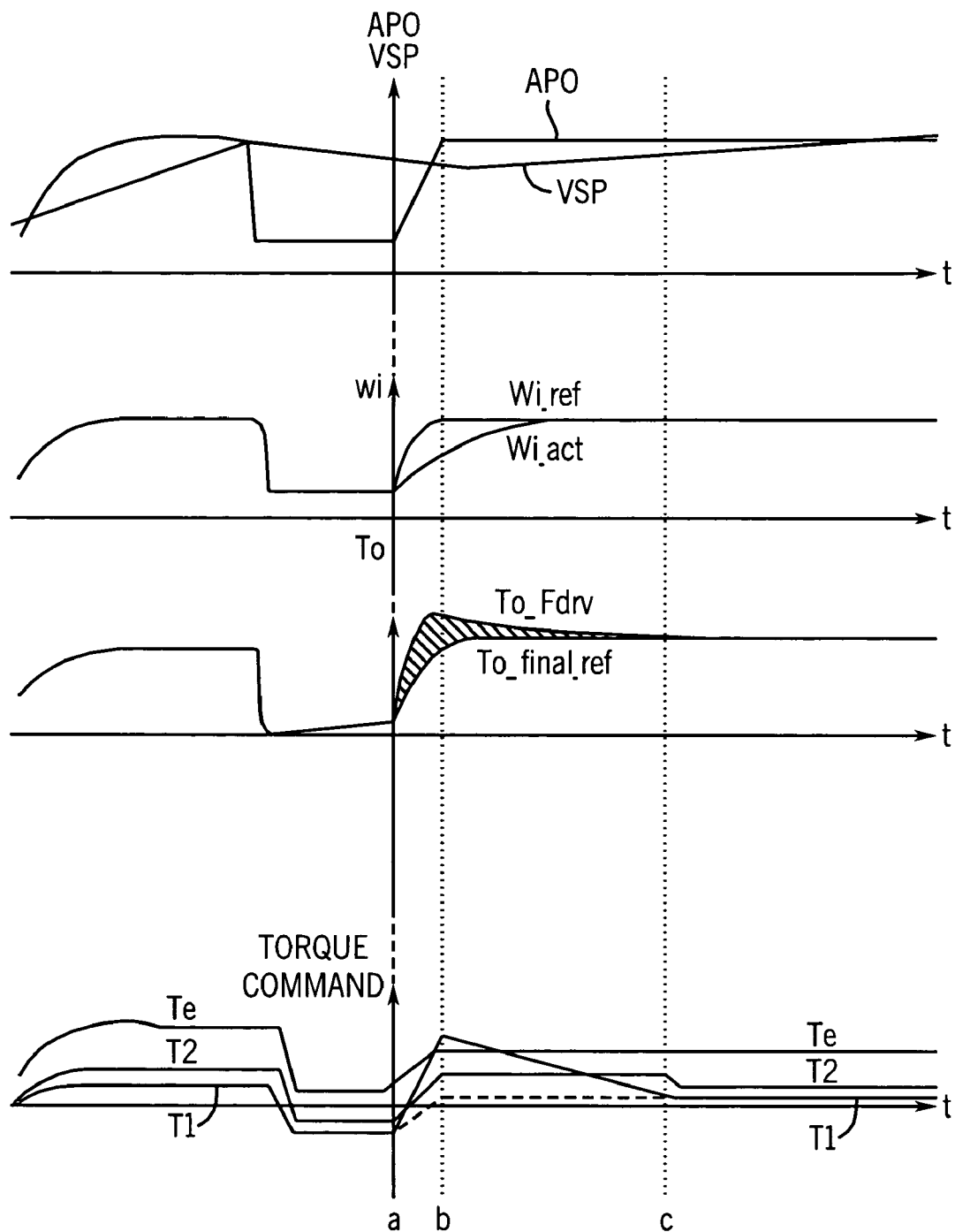
FIG. 11 is a time (c)hart showing torque commands of the accelerator position (APO), vehicle speed (VSP), number of rotations of target lever input points (Wi_ref), number of rotations of actual lever input poins (Wi_act), actual driving force (To_Fdrv), final target driving force (To_final_ref), engine torque (Te), first motor generator torque (T1) and second motor generator torque (T2), during low speed ratio change which is done by the kick-down operation of Embodiment 1.

The operation of the low speed ratio change by the kick-down operation of Embodiment 1 is described by using the time chart of FIG. 11 which shows accelerator position APO, vehicle speed VSP, target lever input point rotating number Wi_ref, actual lever input point rotating number Wi_act, actual driving force To_Fdrv, final target driving force To_final_ref and torque commands of engine torque Te, first motor generator torque T1 and second motor generator torque T2. Here, the time chart shows the speed ratio change operation of the case where the kick-down operation is initiated by the rapid acceleration at time (a) and the condition for starting the speed ratio change using a inertia response is established immediately after time (a).

From time (a), when the driver pushes down the accelerator, to time (b), when the amount of the accelerating power is maximum, engine torque Te and second motor generator torque T2 are increased in a gentle slope. On the other hand, during this period, first motor generator torque T1 is increased in a steep slope compared with the characteristic of the normal speed ratio change shown in the broken line. At time (b), first motor generator torque T1 is maximum. From time (b) to time (c), engine torque Te and second motor generator torque T2 maintains the values at time (b). During the same period, the value of first motor generator torque T1 is decreased in a gentle slope so that it reaches the torque level of the normal speed ratio change shown in the broken line at time (c).

In other words, compared with the normal speed ratio change, a larger amount of torque, which is the area made from the broken line and the straight line, is allocated to first motor generator torque T1. Therefore, from time (a) to time (c), with time (b) being the peak, inertia increasing driving force To_inertia which uses the inertia response of second motor generator MG2 is added. Actual driving force To_Fdrv is increased from target final driving force To_final_ref by the inertia portion shown in the hatching of FIG. 11.

Next, the effect will be described. In the speed ratio change control device of the vehicle of Embodiment 1, it is possible to obtain effects cited below.

(1) In a vehicle speed ratio change control device, the device includes a first torque generating element, a second torque generating element, wherein at least one of the first torque generating element and the second torque generating element is a driving force, and a differential arrangement, wherein the differential arrangement has two degrees of freedom and at least three rotating elements and an output element and the first and second torque generating elements are connected to the differential arrangement. The device also includes an speed ratio change using an inertia response that utilizes inertia of at least one of the first and second torque generating elements to affect the output element and a speed ratio change control means that controls a speed ratio at a variable speed based on the driving force, wherein the speed ratio change control means determines torque command values for the first and second torque generating elements when driving force command values are changed such that the speed ratio change using an inertia response is engaged. As a result, when a command value of a demanded driving force is changed, inertia of the torque generating element is used thereby improving the ability to increase and decrease the output driving force and the responsiveness of the increase and decrease of the output driving force.

(2) The previously described speed ratio change control means determines that it is possible to conduct the low speed ratio change operation using the inertia response when actual speed ratio iact is "higher" than lowest speed ratio ilow and engine rotating number ωe is predetermined rotating number we1 or less. When accelerator position APO is predetermined threshold value γ or higher and the change in the speed ratio is predetermined threshold value κ or higher, the speed ratio change control means conducts the low speed ratio change operation using the inertia response. As a result, in the running states when the low speed ratio change is feasible, especially during the low speed ratio change followed by a kick-down operation which demands a higher driving force, it is possible to increase the driving force by the inertia response with a good responsiveness.

(3) When the speed ratio change is started, the previously described speed ratio change control means determines inertia increasing driving force To_inertia based on the difference between actual speed ratio iact and lowest speed ratio ilow. By continuously using the inertia response together with the inertia increasing driving force To_inertia, the speed ratio change control means determines the allocation torque ratio of the first torque generating element and the second torque generating ratio and based on the allocation torque ratio, determines a torque command value for both of the torque generating elements. As a result, during the low speed ratio change followed by a kick-down operation which demands a higher driving force, it is possible to continuously obtain the increase of the driving force by the inertia response without a sense of discomfort.

(4) During the speed ratio change operation using the inertia response when actual input rotating number wi_act approaches to predetermined value a or less in target input rotating number Wi_ref, the previously described speed ratio change control means switches over from the torque allocation using the inertia response to the normal torque allocation and finishes the speed ratio change. As a result, it is possible to smoothly move from the speed ratio change using an inertia response to the normal speed ratio change without a sense of discomfort.

(5) The previously described vehicle is a hybrid vehicle which has engine E, first motor generator MG1 and second motor generator MG2 as well as driving force combining transmission TM wherein these driving sources are connected to output gear OG. The previously described driving force combining transmission TM has a differential arrangement wherein four or more rotating elements are arranged in a alignment chart and an input from engine E is allocated to one of two rotating elements which are arranged in the inside of each rotating element. The vehicle also includes output gear OG to the driving system is allocated to the other rotating element and first motor generator MG1 and second motor generator MG2 are respectively allocated to two rotating elements which are arranged in the outside of the rotating elements that are placed inside. As a result, during the running state with the "E-iVT mode" which is the variable speed ratio change mode, when the driver rapidly pushes down the accelerator, he/she can obtain speed acceleration with a good responsiveness to the accelerating operation. When the driver releases the accelerator, he/she can obtain speed reduction with a good responsiveness to the accelerating operation.

(6) The previously described first motor generator MG1 and second motor generator MG2 are made from a multiple motor structure wherein first motor generator MG1 is made from a combination of stator S, which is shared by both first motor generator MG1 and second motor generator MG2, with inner rotor IR while second motor generator MG1 is made from a combination of shared stator S with outer rotor OR. Therefore, by using large-scale second motor generator inertia J2 which is generated from outer rotor OR of second motor generator MG2, increase and decrease of a large-scale and effective driving force is achieved. Also, in the transitory period of the low speed ratio change operation, it is possible to increase the speed accelerating capability of the vehicle and in the transitory period of the high speed ratio change, it is possible to increase the speed reduction capability of the vehicle.

While Embodiment 1 is an example where inertia response is continuously used, Embodiment 2 is an example where during the low speed ratio change which uses a kick-down operation, the use of inertia response is optimized thereby increasing the driving force. Here, the basic structure and basic operation are the same as those of the hybrid vehicle of Embodiment 1 shown in FIGS. 1 to 4. Therefore, the diagrammatic representation and explanation are omitted.

Figure 12:
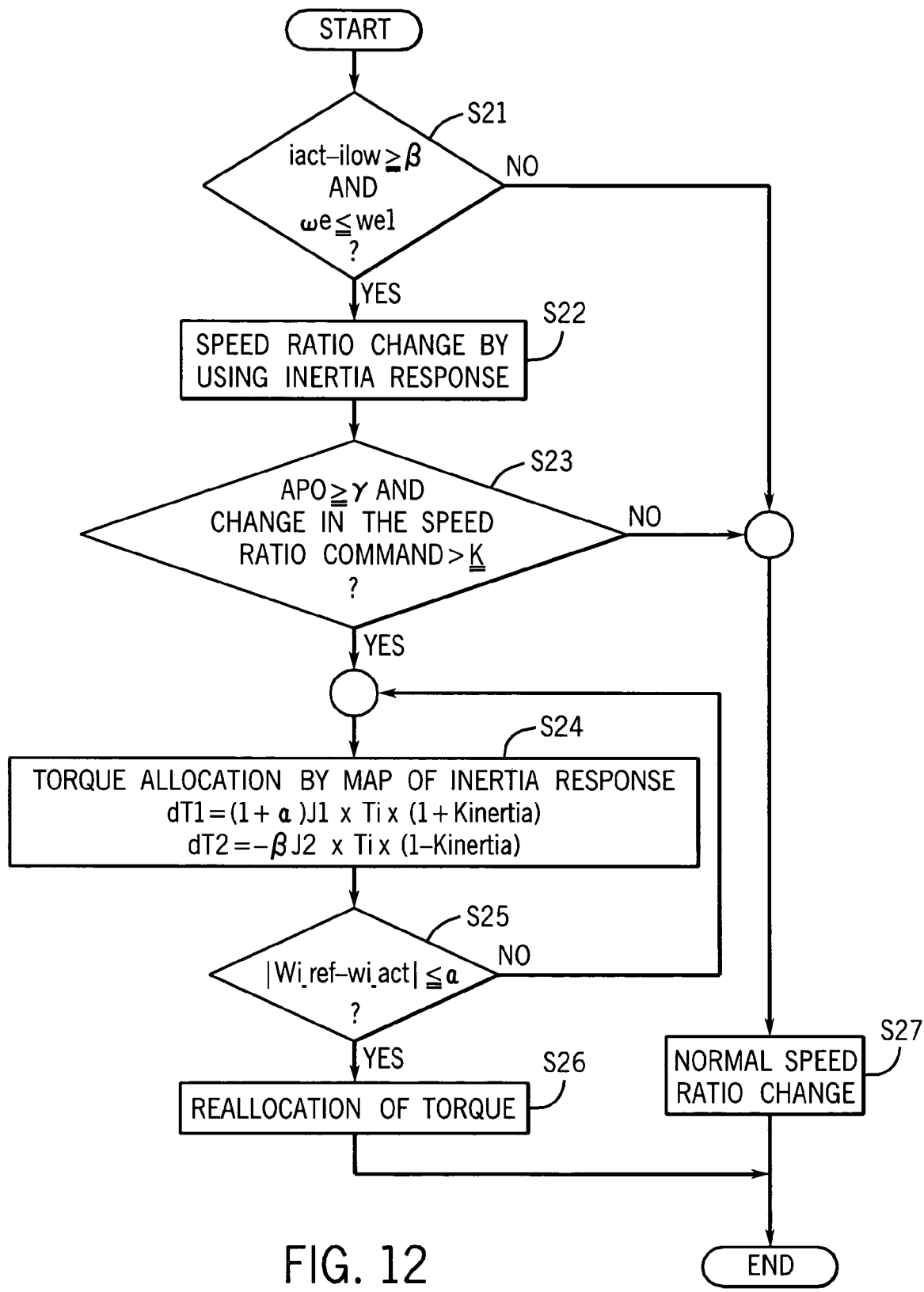
FIG. 12 is a flowchart showing a flow of a speed ratio change control process performed by the integration controller of Embodiment 2.

Next, the mechanism is described. FIG. 12 is a flowchart showing a flow of a speed ratio change control process performed by integration controller 6 of Embodiment 2. Each step is described (speed ratio change control means). Here, since steps S21 to S23 correspond to steps S1 to S3 of FIG. 5 and steps S25 to S27 correspond to steps S5 to S7 of FIG. 5, the explanation is omitted.

In step S24, based on the determination in step S23 that APO$\geq_\gamma$ and change in the speed ratio command $\geq \kappa$, inertia increasing driving force To_inertia is determined by using the difference between actual speed ratio iact and lowest speed ratio ilow (=difference between actual second motor generator input rotating number w2act and lowest second motor generator input rotating number W2low) and the inertia increasing driving force map shown in FIG. 6. Then, based on inertia increasing driving force To_inertia and the inertia response using command map which optimizes the use of the inertia response shown in FIG. 13, dT1-allocated torque ratio K inertia of control torque for speed ratio change dT1 of first motor generator MG1 is determined. Based on the obtained dT1-allocated torque ratio K inertia, the torque allocation of control torque dT1 for speed ratio change of first motor generator MG1 and control torque dT2 for speed ratio change of second motor generator MG2 is determined by using a formula described below. The next step is step S5.

Figure 13:
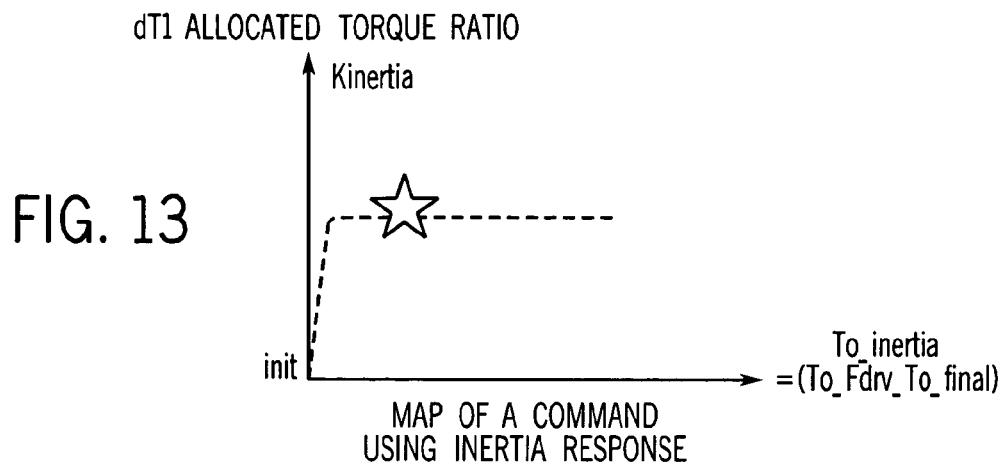
FIG. 13 is a view showing an inertia response-utilized command map which is used in the speed ratio change using an inertia response of Embodiment 2.

Here, to optimize the use of the inertia response, the inertia response using command map shown in FIG. 13 has a characteristic line so that dT1-allocated torque ratio K inertia increases inertia increasing driving force To_inertia (=To_Fdrv−To_final) step by step.

Also, control torque dT1 for speed ratio change and control torque dT2 for speed ratio change are obtained by the following formulas:

$$dT1 = (1+\alpha)J1 \times Ti \times (1+K \text{ inertia})$$

$$dT2 = -\beta J2 \times Ti \times (1-K \text{ inertia}).$$

In the formulas, α and β represent lever ratio and Ti represents lever operating torque which is used to stabilize the speed ratio which is calculated from the deviation of the target rotating number of input points from the actual rotating number. J1 represents inertia of first motor generator MG1 and J2 represents inertia of second motor generator MG2.

Figure 14:
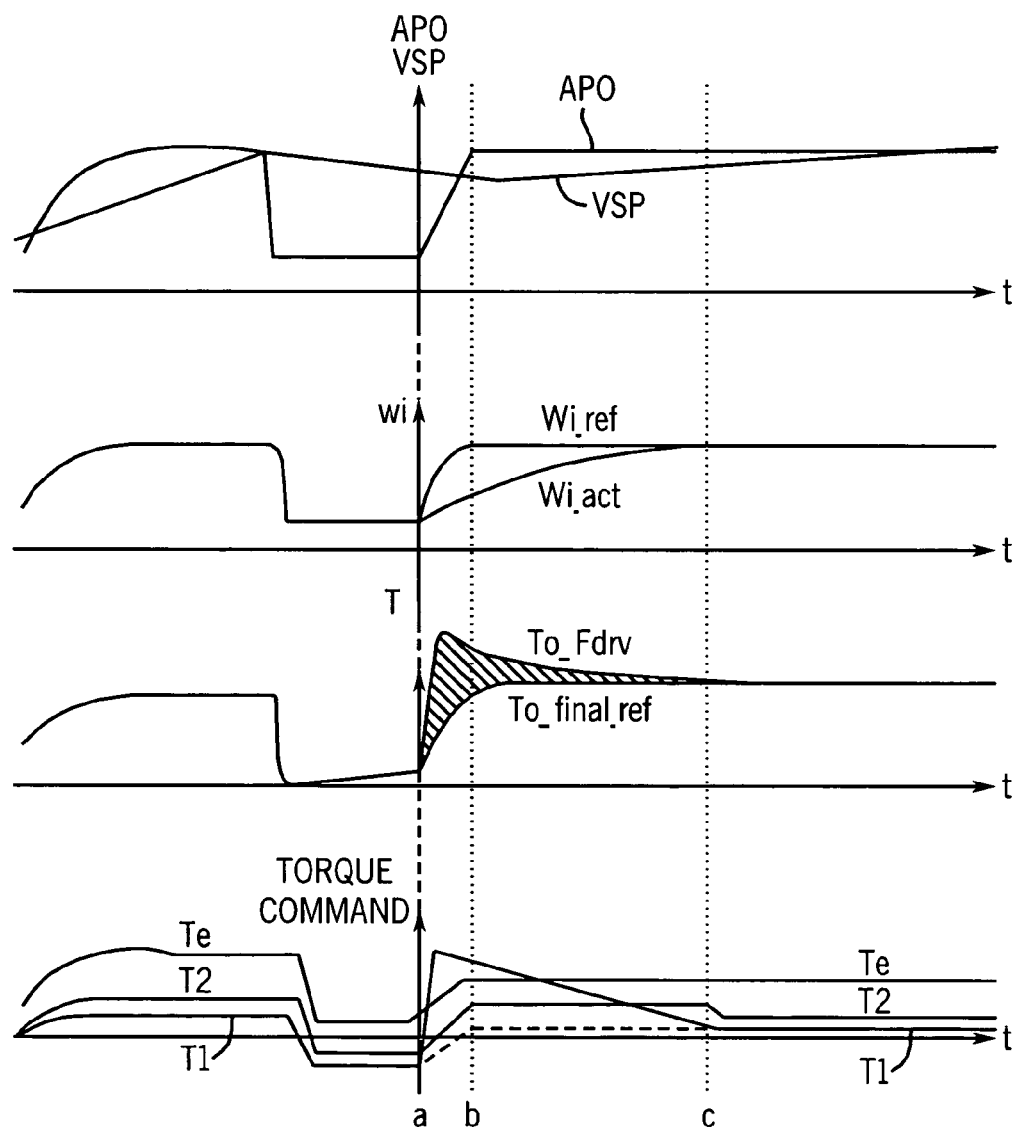
FIG. 14 is a time (c)hart showing torque commands of the accelerator position (APO), vehicle speed (VSP), number of rotations of target lever input points (Wi_ref), number of rotations of actual lever input points (Wi_act), actual driving force (To_Fdrv), final target driving force (To_final_ref), engine torque (Te), first motor generator torque (T1) and second motor generator torque (T2), during low speed ratio change which is done by the kick-down operation of Embodiment 2.

The operation of the low speed ratio change by the kick-down operation of Embodiment 1 is described by using the time chart of FIG. 14 which shows accelerator position APO, vehicle speed VSP, target lever input point rotating number Wi_ref, actual lever input point rotating number Wi_act, actual driving force To_Fdrv, final target driving force To_final_ref and torque commands of engine torque Te, first motor generator torque T1 and second motor generator torque T2. Here, the time chart shows the speed ratio change operation of the case where the kick-down operation is initiated by the rapid acceleration at time (a) and the condition for starting the speed ratio change using a inertia response is established immediately after time (a).

From time (a) when the driver pushes down the accelerator to time (b) when the amount of the accelerating power is maximum, engine torque Te and second motor generator torque T2 are increased in a gentle slope. On the other hand, during this period, first motor generator torque T1 is increased in a slope steeper than that of Embodiment 1 by using the inertia response using command map which optimizes the use of the inertia response. At some point from time (a) to time (b), inertia increasing driving force To_inertia becomes maximum. From time (b) to time (c), engine torque Te and second motor generator torque T2 maintains the values at time (b). During the same period, the value of first motor generator torque T1 is decreased in a gentle slope so that it reaches the torque level of the normal speed ratio change shown in the broken line from the peak to time (c).

In other words, compared with the normal speed ratio change, a larger amount of torque, which is the area made from the broken line and the straight line, is allocated to first motor generator torque T1. Therefore, from time (a) to time (c) with the time immediately after time (a) being the peak, inertia increasing driving force To_inertia which uses the inertia response of second motor generator MG2 is added. Actual driving force To_Fdrv is increased from target final driving force To_final_ref by the inertia portion shown in the hatching of FIG. 14. That is, the driving force peak is greater than that of Embodiment 1.

Next, the effect is described. In the speed ratio change control device of the vehicle of Embodiment 2, in addition to effects (1), (2), (3), (4), (5) and (6) of Embodiment 1, it is possible to obtain effects cited below.

(7) When the speed ratio change is started, the previously described speed ratio change control means determines inertia increasing driving force To_inertia based on the difference between actual speed ratio iact and lowest speed ratio ilow. By optimizing the use of the inertia response together with the inertia increasing driving force To_inertia, the speed ratio change control means determines the allocation torque ratio of the first torque generating element and the second torque generating ratio and based on the allocation torque ratio, determines a torque command value for both of the torque generating elements. As a result, during the low speed ratio change followed by a kick-down operation which demands a higher driving force, it is possible to maximize the driving force by the inertia response and obtain a high acceleration feel.

While Embodiments 1 and 2 are examples wherein during the low speed ratio change by kick-down operation, a driving force is increased by using inertia response, Embodiment 3 is an example wherein during the high speed ratio change by acceleration releasing operation, a driving force is decreased by using the inertia response. Here, the basic structure and basic operation are the same as those of the hybrid vehicle of Embodiment 1 shown in FIGS. 1 to 4. Therefore, the diagrammatic representation and explanation are omitted.

Figure 15:
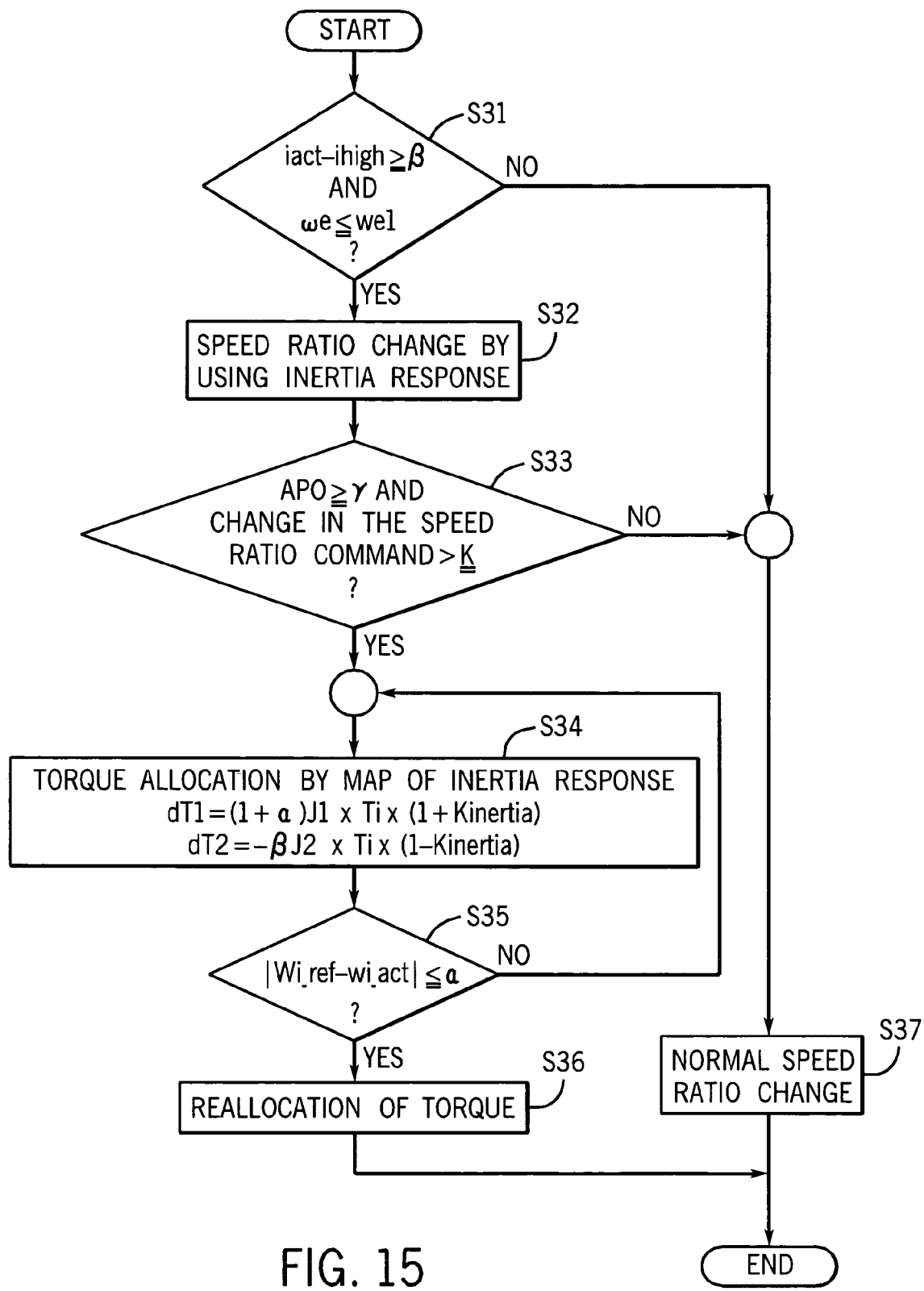
FIG. 15 is a flowchart showing a flow of a speed ratio change control process performed by the integration controller of Embodiment 3.

FIG. 15 is a flowchart showing a flow of a speed ratio change control process performed by integration controller 6 of Embodiment 3. Each step is described (speed ratio change control means).

In step S31, whether or not the difference between actual speed ratio iact and highest speed ratio ihigh is predetermined value β or higher during the "E-iVT mode" with which the vehicle runs is determined, and at the same time, whether or not engine rotating number ωe is predetermined rotating number we1 or less is determined. When the answer to the question is YES, the next step is step S32 and when it is NO, the next step is step S37.

In step S32, based on the determination in step 31 that iact−ihigh≧β and ωe≧we1, that is, the determination that it is possible to change high speed ratio change by using inertia response, the normal speed ratio change mode is shifted to the speed ratio change using an inertia response mode and the next step is step 33.

In step 33, based on the shift to the speed ratio change using a inertia response mode in step 32, whether or not accelerator position APO is predetermined threshold value γ or higher, and at the same time, whether or not the change in the speed ratio command is predetermined threshold value κ or higher. When the answer to the question is YES, the next step is step S34. In other words, in step S33, even when the mode is shifted to the speed ratio change using an inertia response mode, the high speed ratio change which uses the inertia response is implemented only when the driver releases the accelerator. When the answer to the question is NO in step 33, the next step is step S37.

In step S34, based on the determination in step S33 that APO≦γ and change in the speed ratio command ≧κ, inertia decreasing driving force To_inertia is obtained by using a difference between actual speed ratio iact and the highest speed ratio ihigh (difference between actual second motor generator input rotating number w2act and highest second motor generator input rotating number W2high) and the inertia decreasing driving map which is not shown in the figure. Then, based on inertia decreasing driving force To_inertia and the inertia response using command map which continuously uses the inertia response shown in FIG. 16, dT1-allocated torque ratio K inertia of control torque for speed ratio change dT1 of first motor generator MG1 is determined. Based on the obtained dT1-allocated torque ratio K inertia, the torque allocation of control torque dT1 for speed ratio change of first motor generator MG1 and control torque dT2 for speed ratio change of second motor generator MG2 is determined by using a formula described below. The next step is step S35.

Here, to continuously use the inertia response, the inertia response using command map shown in FIG. 16 has a characteristic line so that dT1-allocated torque ratio K inertia increases in proportion to inertia increasing driving force To_inertia (=To_Fdrv−To_final).

Also, control torque dT1 for speed ratio change and control torque dT2 for speed ratio change are obtained by the following formulas:

$$dT1 = (1+\alpha)J1 \times Ti \times (1+K \text{ inertia})$$

$$dT2 = -\beta J2 \times Ti \times (1-K \text{ inertia}).$$

In the formulas, α and β represent lever ratio and Ti represents lever operating torque which is used to stabilize the speed ratio which is calculated from the deviation of the target rotating number of input points from the actual rotating number. J1 represents inertia of first motor generator MG1 and J2 represents inertia of second motor generator MG2.

In step S35, based on the torque allocation by the inertia response map in step S34, whether or not the absolute value of the difference between the target input rotating number Wi_ref and the actual input rotating number wi_act is predetermined value α or less is determined. When the answer to the question is YES, the next step is step S36 and when it is NO, the next step is back to step S34.

In step S36, based on the determination in step S35 that |Wi_ref−wi_act|≦α, the torque allocation which uses the inertia response is shifted to the torque allocation with normal speed ratio change thereby ending the speed ratio change using a inertia response and moving on to END.

In step S37, based on the determination in step S31 that the answer is YES to iact−ihigh≧β and that it is NO to ωe≧we1, or the determination in step S33 that the answer is YES to APO≦γ and that it is NO to change in the speed ratio command ≧κ, normal speed ratio change wherein inertia of each element is offset by the elements themselves is implemented thereby moving on to END.

Step S31 is followed by step S37 in the flowchart of FIG. 15 when the vehicle runs in the "E-iVTmode", the difference between actual speed ratio iact and the highest speed ratio ihigh is less than predetermined value β, or engine rotating number ωe is less than predetermined rotating number we1. In step S37, the normal speed ratio change for the transmission is implemented wherein the inertia of each element is offset by the elements themselves.

When the vehicle runs selecting the "E-iVT mode", iact−ihigh≧β and ωe≧we1. However, when accelerator position APO exceeds the predetermined threshold value γ, and the change in the speed ratio is less than predetermined threshold value κ, step S31 is followed by step S32, step S32 is followed by step S33 and step S33 is followed by step S37 in the flowchart of FIG. 15 to allocate torque correctly. In step S37, normal speed ratio change wherein inertia of each element is offset by the elements themselves is implemented.

On the other hand, when the driver releases the accelerator when the vehicle runs in the "E-iVT mode", iact−ihigh≧β and ωe≧we1, and APO≦γ. In addition, the change in the speed ratio command ≧κ, so step S31 is followed by step S32, step S32 is followed by step S33, step S33 is followed by step S34, and step S34 is followed by step S35 in the flowchart of FIG. 15 to adjust for the decrease in APO. In step S34, the torque allocation that uses the inertia response is implemented until the determination is done as |Wi_ref−wi_act|≦α in step S35. When the determination is done as |Wi_ref−wi_act|≦α in step S35, step S35 is followed by step S36. In step S36, the torque allocation that uses the inertia response is shifted to the torque allocation in the normal speed ratio change, thereby ending the speed ratio change using the inertia response.

First, in the hybrid system shown in Embodiment 1, during the high speed ratio change by releasing of the accelerator, normally, control torque for speed ratio change Ti is calculated from the difference between the target input rotating number and actual input rotating number after the speed ratio change is done. Then, torque dT1, dTe and dT2 for speed ratio change is calculated from the lever ratio and the inertia of each element. Torque fT1, fTe and fT2 for driving is calculated from the demanded driving force and the lever balance in the "E-iVT mode". Then, by combining torque dT1, dTe and dT2 with torque fT1, fTe and fT2 for driving, torque command values for the engine, the first motor generator and the second motor generator are determined. By outputting these torque command values, the lever is operated and speed ratio change is shifted (FIG. 7(a)).

Here, the formulas to calculate control torque Ti for speed ratio change and torque dT1 and dT2 for speed ratio change are as follows:

$$Ti = k_{PID} \times (\omega i\_ref - \omega i\_act)$$

$$dT1 = (1+\alpha) J1 \times Ti$$

$$dT2 = -\beta J2 \times Ti.$$

However, in the previously described normal speed ratio change control method, when torque dT1, dTe and dT2 for speed ratio change is calculated, each torque generating element itself offsets inertia J1, J2 and Je of each torque generating element (engine, first motor generator and second motor generator) to shift the gear. Therefore, for example, when the speed ratio change is shifted to high by the releasing of the accelerator and the like, it is not possible to exceed the driving force which is determined by the combination of torque for driving fT1, fTe and fT2 of each torque generating element. Therefore, decrease of the driving force with a good responsiveness which corresponds to the releasing of the accelerator by the driver cannot be expected. On the other hand, if a speed reduction feel is sought by cutting the engine fuel, the minus driving force is determined by the friction which is not continuous.

On the other hand, in the speed ratio change control of Embodiment 3, when the command value for the demanded driving force by the releasing of the accelerator and the like is decreased, torque dT1 and dT2 for speed ratio change of both motor generators MG1 and MG2 is determined so that the reaction torque which uses the inertia of second motor generator MG2 is transitionally operated for output gear OG.

In other words, when the speed ratio change is shifted to high by the releasing of the accelerator and the like, as shown in FIG. 17(b), torque dT1 for speed ratio change of first motor generator MG1 takes partial charge of inertia J2 of the second motor generator and allocates more than torque dT1 for normal speed ratio change. As a result, the inertia response torque of second motor generator MG2 transitionally affects output gear OG. The driving force which affects the output gear OG is made of the driving force determined by a combination of the torque for driving of each torque generating element minus the inertia decreasing driving force To_inertia which uses the inertia response. As a result, the driving force is decreased with a good responsiveness to the releasing of the accelerator by the driver. In other words, while normally inertia of each torque generating element is offset by the elements themselves, in this case, the offset inertia is effectively used to decrease the driving force.

Consequently, when the command value for the demanded driving force is decreased, the inertia response of second motor generator MG2 is used and, as shown in FIG. 18, compared with a commonly-used hybrid vehicle (HEV), it is possible to improve the ability to decrease output driving force Fdrv and the responsiveness to decrease the driving force.

Figure 19:
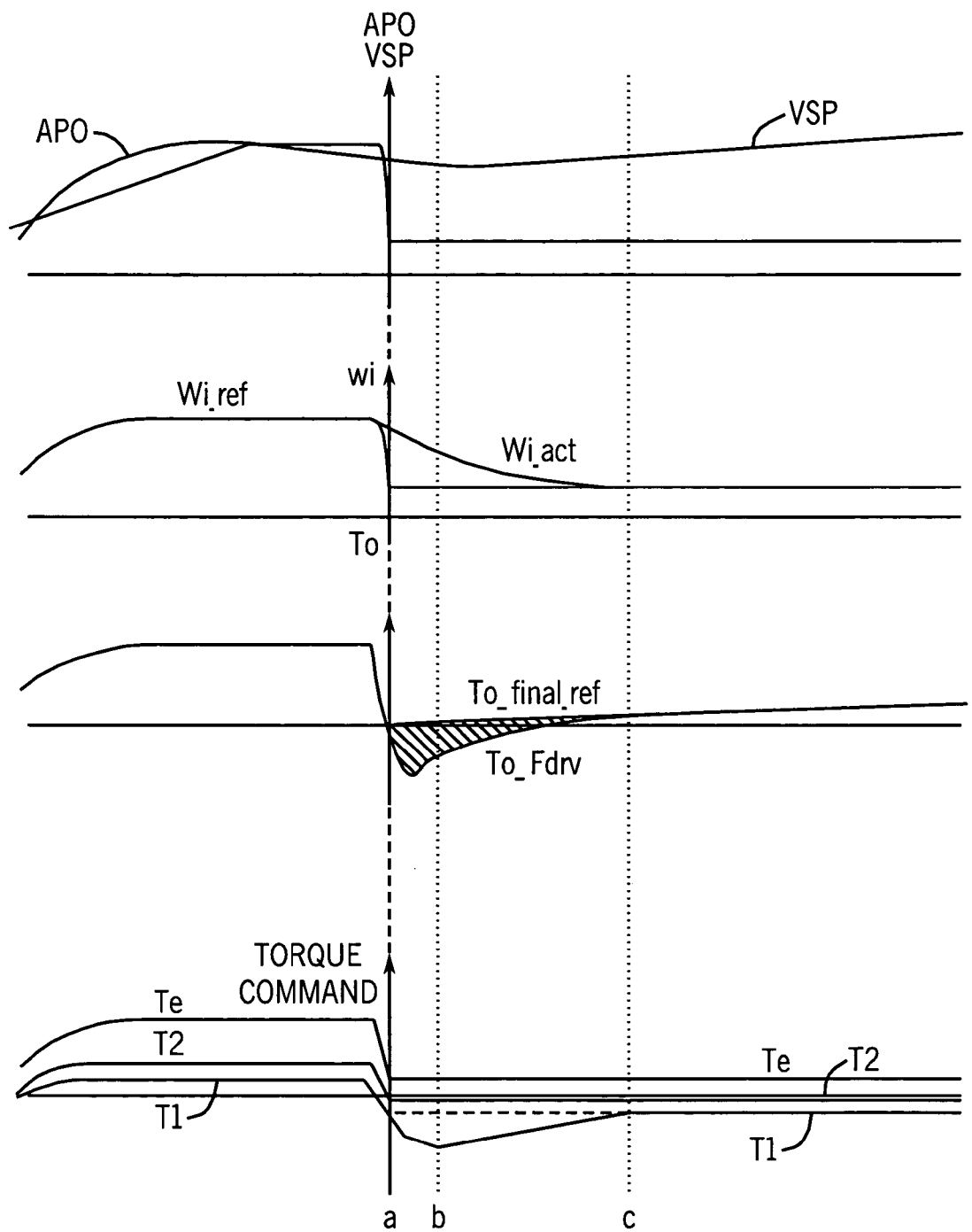
FIG. 19 is a time chart showing torque commands of the accelerator position (APO), vehicle speed (VSP), number of rotations of target lever input points (Wi_ref), number of rotations of actual lever input points (Wi_act), actual driving force (To_Fdrv), final target driving force (To_final_ref), engine torque (Te), first motor generator torque (T1) and second motor generator torque (T2), during high speed ratio change which is done by the accelerator releasing operation of Embodiment 3.
Figure 20A:
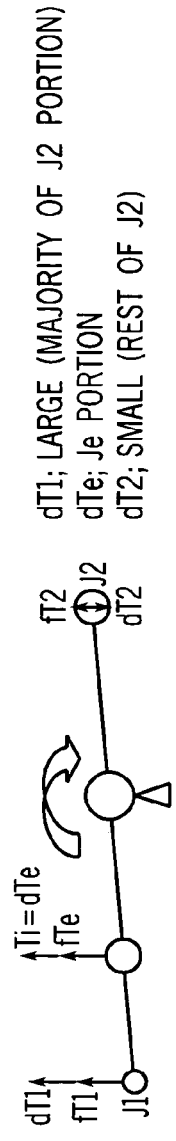
FIGS. 20(a)-20(e) are alignment chart showing five patterns of allocations of a torque command value during low speed ratio change which is done by the kick-down operation of Embodiment 5.
Figure 20B:
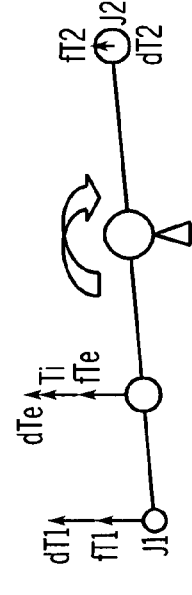
Figure 20C:
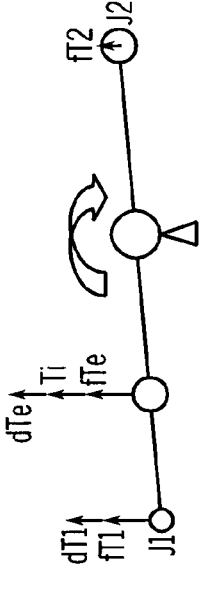
Figure 20D:
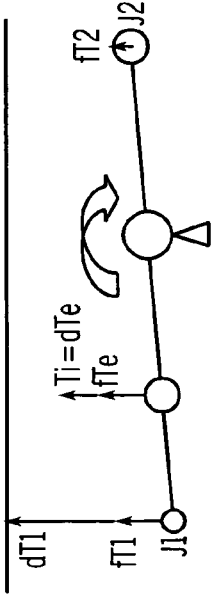
Figure 20E:
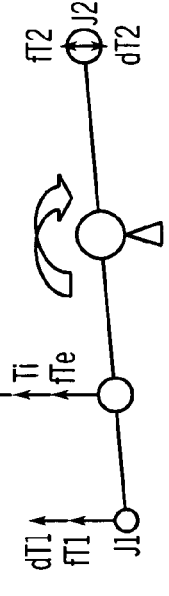

The operation of the high speed ratio change by the releasing of the accelerator of Embodiment 3 is described by using the time chart of FIG. 19 which shows accelerator position APO, vehicle speed VSP, target lever input point rotating number Wi_ref, actual lever input point rotating number Wi_act, actual driving force To_Fdrv, final target driving force To_final_ref and torque commands of engine torque Te, first motor generator torque T1 and second motor generator torque T2. Here, the time chart shows the speed ratio change operation of the case where the releasing of the accelerator is initiated right before time (a) and the condition for starting the speed ratio change using an inertia response is established at time (a).

From the time when the driver starts to release the accelerator to time (a), engine torque Te and second motor generator torque T2 decrease in a steep slope. After time (a), the values at time (a) are maintained. On the other hand, first motor generator torque T1 decreases after the driver starts to release the accelerator and continue to decrease even after time (a) until time (b). Then, from time (b), first motor generator torque T1 is increased in a gentle slope so that at time (c), it reaches the torque level of the normal speed ratio change shown in the broken line.

In other words, compared with the normal speed ratio change, a smaller amount of torque, which is the area made from the broken line and the straight line, is allocated to first motor generator torque T1. Therefore, from time (a) to time (c), with time (b) being the peak, inertia decreasing driving force To_inertia which uses the inertia response of second motor generator MG2 is deducted. Actual driving force To_Fdrv is decreased from target final driving force To_final_ref by the inertia portion shown in the hatching of FIG. 19.

Next, the effect is described. In the speed ratio change control device of the vehicle of Embodiment 3, in addition to effects (1), (4), (5) and (6) of Embodiment 1, it is possible to obtain effects cited below.

(8) The previously described speed ratio change control means determines that it is possible to conduct the high speed ratio change operation using the inertia response when actual speed ratio iact is "lower" than highest speed ratio ihigh and engine rotating number ωe is predetermined rotating number we1 or higher. When accelerator position APO is predetermined threshold value γ or lower and the change in the speed ratio is predetermined threshold value κ or higher, the speed ratio change control means conducts the high speed ratio change operation using the inertia response. As a result, in the running states when the high speed ratio change is feasible, especially during the high speed ratio change followed by releasing of the accelerator which demands a lower driving force, it is possible to decrease the driving force by the inertia response with a good responsiveness.

(9) When the speed ratio change is started, the previously described speed ratio change control means determines inertia decreasing driving force To_inertia based on the difference between actual speed ratio iact and highest speed ratio ihigh. By continuously using inertia response together with the inertia decreasing driving force To_inertia, the speed ratio change control means determines the allocation torque ratio of the first torque generating element and the second torque generating ratio and based on the allocation torque ratio, determines a torque command value for both of the torque generating elements. As a result, during the high speed ratio change followed by releasing of the accelerator which demands a lower driving force, it is possible to continuously obtain the decrease of the driving force by the inertia response without a sense of discomfort.

Embodiment 4 is an example wherein an allocation of torque command values during low speed ratio change by a kick-down operation is determined. Here, except that an allocation of torque command values during low speed ratio change which uses the inertia response is determined, the basic structure and basic operation are the same as those of the hybrid vehicle of Embodiment 1 shown in FIGS. 1 to 4 and the mechanism is also the same as that of Embodiment 1. Therefore, their explanation is omitted.

The next section describes an example of an allocation of torque command values during low speed ratio change which uses inertia response. Example 1 describes an allocation of the torque command values during low speed ratio change using inertia response. As shown in FIG. 20(*a*), first motor generator MG1 allocates first motor generator inertia J1 and the majority of second motor generator inertia J2 to control torque dT1 for speed ratio change. Engine E only allocates engine inertia Je to control torque dTe for speed ratio change. Second motor generator MG2 only allocates the rest of second motor generator inertia J2 to control torque dT2 for speed ratio change.

In Example 1, although engine E and both of motor generators MG1 and MG2 are the same torque generating elements, motor generators MG1 and MG2 have higher control response and the response of engine E is somewhat slower. To solve this problem, control torque dT2 for speed ratio change can compensate for the delay of the response of the engine torque. In other words, the delay of the engine response is covered by the lever ratio. Here, the compensation of the delay of the engine response is done by a different logic.

Example 2 describes an allocation of the torque command values during low speed ratio change using the inertia response. As shown in FIG. 20(*b*), first motor generator MG1 allocates first motor generator inertia J1 and a half of second motor generator inertia J2 to control torque dT1 for speed ratio change. Engine E allocates engine inertia Je and a half of second motor generator inertia J2 to control torque dTe for speed ratio change. Second motor generator MG2 does not give any allocation to control torque dT2 for speed ratio change. In Example 2, it is possible to perform speed ratio change using inertia response by first motor generator torque T1 and engine torque Te.

Example 3 describes an allocation of the torque command values during low speed ratio change using the inertia response. First motor generator MG1 only allocates first motor generator inertia J1 to control torque dT1 for speed ratio change. Engine E allocates engine inertia Je and second motor generator inertia J2 to control torque dTe for speed ratio change. Second motor generator MG2 does not give any allocation to control torque dT2 for speed ratio change. In Example 3, it is possible to allocate all of the torque which uses the inertia response to engine torque Te.

Example 4 describes an allocation of the torque command values during low speed ratio change using the inertia response. First motor generator MG1 allocates first motor generator inertia J1 and second motor generator inertia J2 to control torque dT1 for speed ratio change. Engine E only allocates engine inertia Je to control torque dTe for speed ratio change. Second motor generator MG2 does not give any allocation to control torque dT2 for speed ratio change. In Example 4, the torque which uses torque reaction is allocated in first motor generator torque T1 and maximum value T1max of first motor generator torque is the limited value.

Example 5 describes an allocation of the torque command values during low speed ratio change using the inertia response. First motor generator MG1 only allocates first motor generator inertia J1 to control torque dT1 for speed ratio change. Engine E allocates engine inertia Je and the majority of second motor generator inertia J2 to control torque dTe for speed ratio change. Second motor generator MG2 only allocates the rest of second motor generator inertia J2 to control torque dT2 for speed ratio change. In Example 5, as is the case with Example 1, it is possible to compensate for the delay of the response of the engine torque by control torque dT2 for speed ratio change. In other words, the delay of the engine response is covered by the lever ratio. Here, the compensation of the delay of the engine response is done by a different logic.

Next, the effect is described. In the speed ratio change control device of the vehicle of Embodiment 4, in addition to effects of Embodiments 1, 2 and 3, it is possible to obtain effects cited below.

(10) In the previously described speed ratio change control means, as an allocation of the torque command values during low speed ratio change using the inertia response, first motor generator MG1 allocates first motor generator inertia J1 and the majority of second motor generator inertia J2 to control torque dT1 for speed ratio change. Engine E only allocates engine inertia Je to control torque dTe for speed ratio change. Second motor generator MG2 only allocates the rest of second motor generator inertia J2 to control torque dT2 for speed ratio change. As a result, control torque dT2 for speed ratio change can cover the delay of the response of the engine torque by using the lever ratio.

(11) In the previously described speed ratio change control means, as an allocation of the torque command values during low speed ratio change using the inertia response, first motor generator MG1 allocates first motor generator inertia J1 and a half of second motor generator inertia J2 to control torque dT1 for speed ratio change. Engine E allocates engine inertia Je and a half of second motor generator inertia J2 to control torque dTe for speed ratio change. Second motor generator MG2 does not give any allocation to control torque dT2 for speed ratio change. As a result, it is possible to perform speed ratio change using the inertia response by first motor generator torque T1 and engine torque Te thereby increasing the upper limit of the operation torque.

(12) In the previously described speed ratio change control means, as an allocation of the torque command values during low speed ratio change using inertia response, first motor generator MG1 only allocates first motor generator inertia J1 to control torque dT1 for speed ratio change. Engine E allocates engine inertia Je and second motor generator inertia J2 to control torque dTe for speed ratio change. Second motor generator MG2 does not give any allocation to control torque dT2 for speed ratio change. As a result, it is possible to allocate all the torque which uses inertia response to engine torque Te.

(13) In the previously described speed ratio change control means, as an allocation of the torque command values during low speed ratio change using the inertia response, first motor generator MG1 allocates first motor generator inertia J1 and second motor generator inertia J2 to control torque dT1 for speed ratio change. Engine E only allocates engine inertia Je to control torque dTe for speed ratio change. Second motor generator MG2 does not give any allocation to control torque dT2 for speed ratio change. As a result, it is possible to allocate the torque which uses inertia response to first motor generator torque T1.

(14) In the previously described speed ratio change control means, as an allocation of the torque command values during low speed ratio change using the inertia response, first motor generator MG1 only allocates first motor generator inertia J1 to control torque dT1 for speed ratio change. Engine E allocates engine inertia Je and the majority of second motor generator inertia J2 to control torque dTe for speed ratio change. Second motor generator MG2 only allocates the rest of second motor generator inertia J2 to control torque dT2 for speed ratio change. As a result, control torque dT2 for speed ratio change can cover the delay of the response of the engine torque by using the lever ratio.

The speed ratio change control device of the vehicle of the present invention is described above based on Embodiments 1 to 4. However, the practical structure is not limited to these embodiments. As long as the structure is deviated from the scope of the invention concerning each of the claims, modification or addition of the design is allowed.

Embodiments 1 to 4 describe examples wherein the speed ratio change using an inertia response is used during low speed ratio change followed by a kick-down operation and during high speed ratio change followed by releasing of the accelerator. If there are operations wherein increasing and decreasing driving forces are demanded, the inertia response may be used other than the cases of the previously described specific operations. In other words, the speed ratio change control means is not limited to Embodiment 1 as long as it determines a torque command value for a torque generating element so that, when a demanded driving force command value is changed, it performs speed ratio change using an inertia response wherein the reaction torque which uses one of two torque generating elements, transitionally affects an output element.

Embodiments 1 to 4 describe examples of the hybrid vehicle equipped with a driving force combining speed ratio change which uses one engine and two motor generators as the driving sources and has Ravigneaux planetary gear rows, an engine clutch and low brake. However, the speed ratio change control device of the present invention can be used for a hybrid vehicle which has one set of or a plurality of simple planetary gears instead of Ravigneaux planetary gear rows. Also, it can be used for an electric vehicle which is equipped with two motor generators. In other words, as long as a vehicle is equipped with a speed ratio change control means wherein, when it is collinearly viewed, two torque generating elements are connected through an output element to both sides of a differential arrangement which has at least first torque generating element and second torque generating element as the driving sources and at least three rotating elements and two degrees of freedom. The speed ratio change control means controls the speed ratio of the differential arrangement at variable speed when a command value of demanded driving force is changed.

Various embodiments of the invention have been described. These and other embodiments are within the scope of the following claims.

The invention claimed is:
1. A speed ratio change control system comprising:
a first torque-generating element;
a second torque-generating element;
a differential having two degrees of freedom and at least three rotating elements that are connected to an output element, the first torque-generating element and the second torque-generating element, respectively; and a speed ratio change controller arranged and configured to control a speed ratio of a vehicle based on a demanded driving force, the speed ratio change controller arranged and configured to change the speed ratio by transitionally adding at least a part of an inertia response of one of the first and second torque-generating elements to the other of the first and second torque-generating elements.

2. The system of claim 1, wherein
the differential is arranged and configured such that the output element is arrayed inwardly on an alignment chart and the first torque-generating element and the second torque-generating element are respectively arrayed outwardly on the alignment chart.

3. The system of claim 1, wherein
the speed ratio change controller is arranged and configured to change the speed ratio toward a lowest speed ratio by using the reaction torque when an actual speed ratio is higher than the lowest speed ratio, an engine rotating number is less than or equal to a predetermined rotating number, an accelerator opening amount is higher than or equal to a predetermined threshold value, and a change of speed ratio change command is higher than or equal to a predetermined threshold value.

4. The system of claim 3, wherein
the speed ratio change controller is further arranged and configured to determine an inertia increasing driving force based on the difference between the actual speed ratio and the lowest speed ratio when the speed ratio change is started, determine an allocation torque ratio of the first torque generating element and the second torque generating element based on the inertia increasing driving force so as to continuously change the speed ratio, and determine the torque command value for both of the torque generating elements based on the allocation torque ratio.

5. The system of claim 3, wherein
the speed ratio change controller is further arranged and configured to determine an inertia increasing driving force based on the difference between the lowest speed change ratio and a speed ratio when the speed change is started, determine an allocation torque ratio of the first torque generating element and the second torque generating element based on the inertia increasing driving force so as to utilize the reaction torque maximally, and determine the torque command value for both of the torque generating elements based on the allocation torque ratio.

6. The system of claim 1, wherein
the speed ratio change controller is arranged and configured to change the speed ratio to a high speed ratio by using the reaction torque when an actual speed ratio is lower than a highest speed gear ratio, an engine rotating number is more than or equal to a predetermined rotating number, an accelerator opening amount is lower than or equal to a predetermined threshold value, and a change of the speed ratio change command is higher than or equal to a predetermined threshold value.

7. The system of claim 6, wherein
the speed ratio change controller is further arranged and configured to determine an inertia increasing driving force based on the difference between the actual speed ratio and the highest speed ratio when the speed ratio change is started, determine an allocation torque ratio of the first torque generating element and the second torque generating element based on the inertia increasing driving force so as to continuously change the speed ratio, and determine the torque command value for both of the torque generating elements based on the allocation torque ratio.

8. The system of claim 1, wherein
the speed ratio change controller is further arranged and configured to switch from the allocation torque ratio using the reaction torque to a normal torque allocation and finish the speed ratio change when an actual input rotating number approaches to less than or equal to a predetermined value in a target input rotating number.

9. The system of claim 1, further comprising:
a third torque-generating element having an engine,
the first torque-generating element having a first motor-generator,
the second torque-generating element having a second motor-generator, and
the differential being arranged and configured in such a way that the output element and the engine are respectively arrayed inwardly on an alignment chart and the first motor-generator and the second motor-generator are respectively arrayed outwardly on the alignment chart.

10. The system of claim 9, wherein
the first motor-generator and the second motor-generator share a common stator in a multiple motor structure,
the first motor-generator includes an inner rotors and
the second motor-generator includes an outer rotor in the multiple motor structure.

11. The system of claim 10, wherein
the speed ratio change controller changes the speed ratio by transitionally adding a majority of the inertia response of the second motor-generator to the first motor-generator when the speed ratio is changed toward a lowest speed ratio.

12. The system of claim 10, wherein
the speed ratio change controller changes the speed ratio by transitionally adding a half of the inertia response of the second motor-generator to the first motor-generator and the remaining half of the inertia response of the second motor-generator to the engine when the speed ratio is changed toward a lowest speed ratio.

13. The system of claim 10, wherein
the speed ratio change controller changes the speed ratio by transitionally adding all of the inertia response of the second motor-generator to the engine when the speed ratio is changed toward a lowest speed ratio.

14. The system of claim 10, wherein
the speed ratio change controller changes the speed ratio by transitionally adding all of the inertia response of the second motor-generator to the first motor-generator when the speed ratio is changed toward a lowest speed ratio.

15. A speed ratio change control system for a vehicle comprising:
a plurality of means for generating torque;
means for connecting the plurality of the torque generating means and an output element;
means for controlling a speed ratio of a vehicle based on a demanded driving force, the controlling means arranged and configured to change the speed ratio by transitionally adding at least a part of an inertia response of one of the plurality of the torque generating means to the other of the plurality of the torque generating means.

16. The system of claim 15, wherein
the connecting means is arranged and configured such that the output element is arrayed inwardly on an alignment chart and the plurality of torque generating means is arrayed outwardly on the alignment chart.

17. The system of claim 15, wherein
the controlling means is arranged and configured to change the speed ratio toward a lowest speed ratio by using a reaction torque when an actual speed ratio is higher than the lowest speed ratio, an engine rotating number is less than or equal to a predetermined rotating number, an accelerator opening amount is higher than or equal to a predetermined threshold value, and a change of a speed ratio change command is higher than or equal to a predetermined threshold value.

18. The system of claim 15, wherein
the controlling means is arranged and configured to change the speed ratio to a high speed ratio by using a reaction torque when an actual speed ratio is lower than a highest speed gear ratio, an engine rotating number is more than or equal to a predetermined rotating number, an accelerator opening amount is lower than or equal to a predetermined threshold value, and a change of the speed ratio change command is higher than or equal to a predetermined threshold value.

19. The system of claim 15, wherein
the plurality of the torque generating means shares a common stator fitted between an inner rotor and an outer rotor of a multiple motor structure.

20. A speed ratio change control system comprising:
a first torque-generating element;
a second torque-generating element;
a third torque-generating element having an engine;
a differential having two degrees of freedom and at least three rotating elements that are connected to an output element, the first torque-generating element, the second torque-generating element, and the third torque-generating element; and
a speed ratio change controller arranged and configured to control a speed ratio of a vehicle based on a demanded driving force,
the speed ratio change controller arranged and configured to change the speed ratio by transitionally adding at least a part of an inertia response of one of the first and second torque-generating elements to the other of the first and second torque-generating elements.

* * * * *